United States Patent
Morris et al.

(10) Patent No.: US 8,646,719 B2
(45) Date of Patent: Feb. 11, 2014

(54) MARINE VESSEL-TOWABLE AEROVEHICLE SYSTEM WITH AUTOMATED TOW LINE RELEASE

(75) Inventors: John William Morris, Apple Valley, MN (US); Charles A. Jarnot, Milford, KS (US)

(73) Assignee: Heliplane, LLC, Edina, MN (US)

( * ) Notice: Subject to any disclaimer, the term of this patent is extended or adjusted under 35 U.S.C. 154(b) by 124 days.

(21) Appl. No.: 13/215,034

(22) Filed: Aug. 22, 2011

(65) Prior Publication Data

US 2012/0091259 A1    Apr. 19, 2012

Related U.S. Application Data

(60) Provisional application No. 61/376,248, filed on Aug. 23, 2010.

(51) Int. Cl.
*B65D 3/00* (2006.01)
*B65D 47/00* (2006.01)

(52) U.S. Cl.
USPC ...................................................... 244/1 TD

(58) Field of Classification Search
USPC ........ 244/33, 30, 31, 114 R, 115, 116, 153 R, 244/154, 155 R, 155 A, 6, 8, 17.11, 17.19, 244/17.23
See application file for complete search history.

(56) References Cited

U.S. PATENT DOCUMENTS

| 1,017,200 | A | * | 2/1912 | Brackett ........................ 244/33 |
| 1,590,497 | A | | 6/1926 | de la Cierva |
| 1,838,327 | A | | 12/1931 | Salisbury et al. |
| 1,947,901 | A | | 2/1934 | de la Cierva |
| 1,977,834 | A | | 10/1934 | Pitcairn |
| 2,181,477 | A | * | 11/1939 | Chupp ........................ 244/154 |
| 2,298,912 | A | | 10/1942 | Alabrune |
| 2,352,342 | A | | 6/1944 | Pircairn |

(Continued)

FOREIGN PATENT DOCUMENTS

| GB | 2129382 | * | 5/1984 | ............. B64D 39/00 |
| WO | 2008/085547 | | 7/2008 | |
| WO | 2009/054015 | | 4/2009 | |

OTHER PUBLICATIONS

Electronic Warfare Manual; Joint Publication 3-13.1; Jan. 25, 2007.*

(Continued)

*Primary Examiner* — Tien Dinh
*Assistant Examiner* — Michael A Fabula
(74) *Attorney, Agent, or Firm* — Benjamin C. Armitage; Billion & Armitage

(57) ABSTRACT

An unmanned, towable air vehicle is described and includes electronic sensors to increase the detection range relative to the horizon detection limitations of a surface craft, an autogyro assembly to provide lift, and a controller to control operation the autogyro assembly for unmanned flight. A forward motive force powers the autogyro assembly to provide lift. In an example, the autogyro assembly includes a mast extending from the container, a rotatable hub on an end of the mast, and a plurality of blades connected to the hub for rotation to provide lift to the vehicle. In an example, an electrical motor rotates the blades prior to lift off to assist in take off. The electrical motor does not have enough power to sustain flight of the vehicle in an example.

26 Claims, 30 Drawing Sheets

(56) References Cited

U.S. PATENT DOCUMENTS

| | | | |
|---|---|---|---|
| 2,373,086 A | | 4/1945 | Alabrune |
| 2,425,309 A | | 8/1947 | Ennis |
| 2,429,502 A | * | 10/1947 | Young ........................ 244/154 |
| 2,442,846 A | * | 6/1948 | Dunn ........................ 244/153 A |
| 2,453,139 A | | 11/1948 | Kleinkot |
| 2,472,290 A | * | 6/1949 | Fernstrum .................... 244/154 |
| 2,520,620 A | | 8/1950 | Ashwood |
| 2,894,763 A | | 7/1959 | Karnath et al. |
| 2,995,740 A | * | 8/1961 | Shreckengost ................ 342/58 |
| 3,857,194 A | * | 12/1974 | Guttman ........................ 446/36 |
| 4,154,017 A | * | 5/1979 | Bilardi et al. .................. 446/36 |
| 4,161,843 A | * | 7/1979 | Hui ................................ 446/37 |
| 4,416,436 A | | 11/1983 | Wilson, Jr. |
| 4,730,795 A | | 3/1988 | David |
| 5,115,997 A | * | 5/1992 | Peterson ........................ 244/25 |
| 5,188,313 A | | 2/1993 | Piasecki |
| 5,301,900 A | | 4/1994 | Groen |
| 5,381,988 A | * | 1/1995 | Kattas ...................... 244/153 A |
| 5,544,844 A | | 8/1996 | Groen |
| 5,996,934 A | * | 12/1999 | Murph ...................... 244/17.25 |
| 6,029,928 A | | 2/2000 | Kelly |
| 6,220,543 B1 | | 4/2001 | Uskolovsky |
| 6,422,506 B1 | * | 7/2002 | Colby ........................ 244/1 TD |
| 6,874,729 B1 | | 4/2005 | McDonnell |
| 7,109,598 B2 | * | 9/2006 | Roberts et al. ................. 290/44 |
| 7,125,175 B2 | | 10/2006 | Hill |
| 7,161,131 B2 | | 1/2007 | Kimber |
| 7,176,831 B2 | | 2/2007 | Dibble et al. |
| 7,183,663 B2 | * | 2/2007 | Roberts et al. ................. 290/44 |
| 7,259,713 B1 | | 8/2007 | Matich et al. |
| 7,438,259 B1 | | 10/2008 | Piasecki et al. |
| 7,604,197 B2 | | 10/2009 | Lye et al. |
| 7,677,491 B2 | | 3/2010 | Merems et al. |
| 7,775,483 B2 | * | 8/2010 | Olson ........................ 244/153 R |
| 8,115,665 B2 | * | 2/2012 | Zahavi ............................ 342/13 |
| 8,366,037 B2 | * | 2/2013 | Morris et al. .............. 244/1 TD |
| 8,540,183 B2 | * | 9/2013 | Morris et al. .............. 244/1 TD |
| 2003/0066926 A1 | | 4/2003 | Salesse-Lavergne |
| 2004/0075018 A1 | | 4/2004 | Yamane |
| 2007/0029439 A1 | | 2/2007 | Merems |
| 2007/0176432 A1 | * | 8/2007 | Rolt ................................ 290/55 |
| 2008/0316125 A1 | | 12/2008 | Marrocco et al. |
| 2009/0081043 A1 | | 3/2009 | Jones |
| 2009/0118875 A1 | | 5/2009 | Stroud |
| 2009/0174596 A1 | | 7/2009 | Gekat |
| 2010/0012769 A1 | | 1/2010 | Alber et al. |
| 2010/0013236 A1 | * | 1/2010 | Carroll ............................ 290/55 |
| 2010/0230546 A1 | * | 9/2010 | Bevirt et al. .................. 244/175 |
| 2010/0308174 A1 | * | 12/2010 | Calverley .................. 244/155 A |
| 2011/0139928 A1 | | 6/2011 | Morris |
| 2011/0186687 A1 | * | 8/2011 | Elder ........................ 244/155 A |
| 2011/0222047 A1 | * | 9/2011 | Guetta et al. .................. 356/4.01 |
| 2011/0266809 A1 | * | 11/2011 | Calverley ........................ 290/55 |
| 2011/0315810 A1 | * | 12/2011 | Petrov ........................ 244/17.23 |
| 2012/0091259 A1 | | 4/2012 | Morris et al. |
| 2012/0104763 A1 | * | 5/2012 | Lind ................................ 290/55 |
| 2012/0112008 A1 | * | 5/2012 | Holifield et al. .......... 244/155 A |

OTHER PUBLICATIONS

Judy Duncan; SnowGoose Bravo UAV; Mar. 30, 2009; <http://thefutureofthings.com/pod/6761/snowgoose-bravo-uav.com>.*
International Search Report and Written Opinion for PCT/US2010/035887 mailed Sep. 13, 2010, 13 pgs.
Williams, P., et al. Dynamics of Towed Payload System Using Multiple Fixed-Wing Aircraft. J. Guidance, Control, and Dynamics. 2009, 32(6), pp. 1766-1780.
Wilson et al.; New concept for low cost VTOL cargo delivery capability; Guidance and Control Conference, Gatlinburg, TN; Aug. 15-17, 1983; Collection of Technical Papers (A83-41659 19-63); New York, American Institute of Aeronautics and Astronautics, 1983, pp. 324-335.
Flight International, US Navy Considers Hybrid UAV Designs, Mar. 28, 2000, p. 22, vol. 157, No. 4721, Reed Business Information, Sutton Surrey, GB.
McPhee, Andrew, Unreal Aircraft, http://www.unrealaircraft.com/qbranch/rotachute.php, Jan. 1, 2003, 2 pgs.
Charnov, Dr. Bruce H., History of Gyroplanes, Autogiro to Gyroplane: 1923-2003, http://www.groenbros.com/history.php, Oct. 30, 2006, Groen Brothers Aviation, Inc., 8 pgs.

* cited by examiner

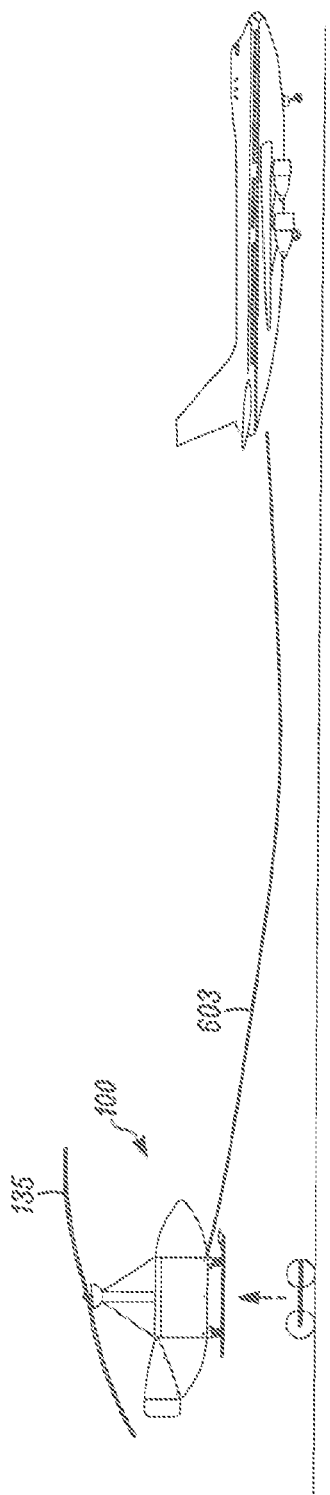
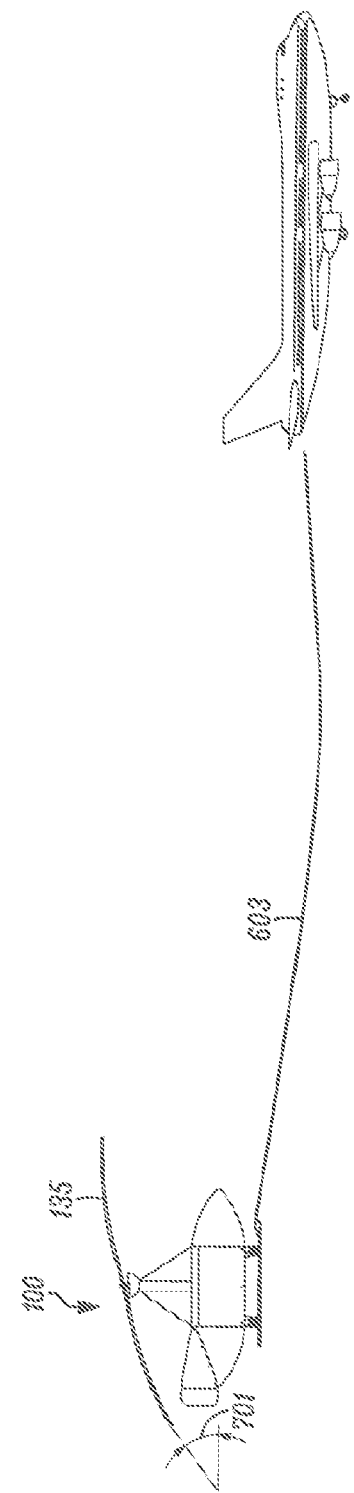

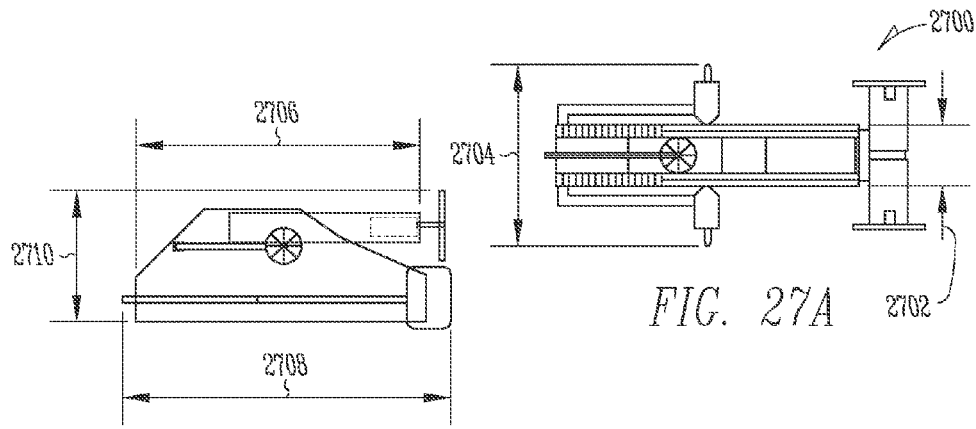
FIG. 27A
FIG. 27B
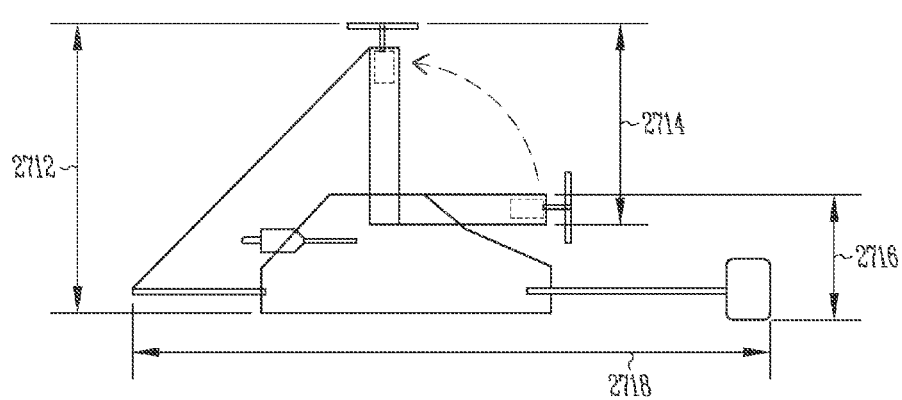
FIG. 27C
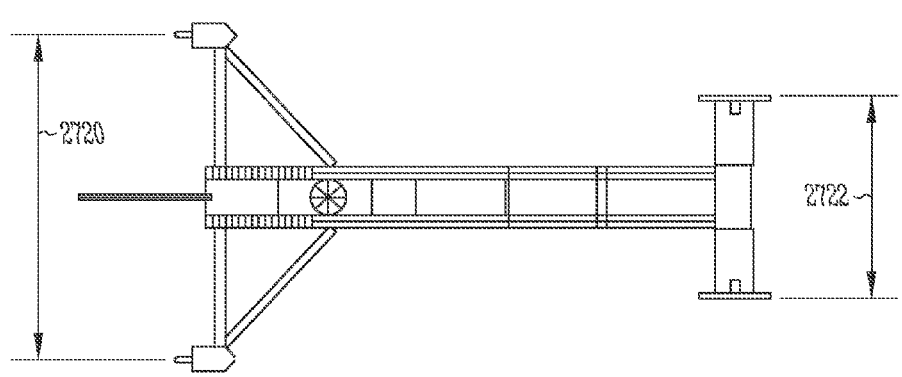
FIG. 27D

MARINE VESSEL-TOWABLE AEROVEHICLE SYSTEM WITH AUTOMATED TOW LINE RELEASE

The present application also claims benefit of U.S. Provisional Application No. 61/376,248, filed 23 Aug. 2010, titled "MARITIME TOWABLE AIR VEHICLE," which is hereby incorporated by reference for any purpose. The present application is related to U.S. Provisional Application No. 61/285,966, filed 9 Dec. 2009; U.S. patent application Ser. No. 12/785,420, filed 21 May 2010; and PCT Application No. PCT/US2010/035887, filed 22 May 2010, all of which are hereby incorporated by reference for any purpose.

FIELD

The present disclosure related to an unmanned towable air vehicle, and more particularly, to an unmanned autogyro for use in maritime and/or surveillance environments.

BACKGROUND

An autogyro aircraft is piloted by a person and derives lift from an unpowered, freely rotating rotary wing or plurality of rotary blades. The energy to rotate the rotary wing results from the forward movement of the aircraft in response to a thrusting engine such as an onboard motor that drives a propeller. During the developing years of aviation aircraft, autogyro aircraft were proposed to avoid the problem of aircraft stalling in flight and to reduce the need for runways. The relative airspeed of the rotating wing is independent of the forward airspeed of the autogyro, allowing slow ground speed for takeoff and landing, and safety in slow-speed flight. Engines are controlled by the pilot and may be tractor-mounted on the front of the pilot or pusher-mounted behind the pilot on the rear of the autogyro. Airflow passing the rotary wing, which is tilted upwardly toward the front of the autogyro, provides the driving force to rotate the wing. The Bernoulli Effect of the airflow moving over the rotary wing surface creates lift.

U.S. Pat. No. 1,590,497 issued to Juan de la Cierva of Madrid, Spain, illustrated a very early embodiment of a manned autogyro. Subsequently, de la Cierva obtained U.S. Pat. No. 1,947,901 which recognized the influence of the angle of attack of the blade of a rotary wing. The optimum angle of attack for the blades or rotary wing was described by Pitcairn in U.S. Pat. No. 1,977,834 at about the same time. In U.S. Pat. No. 2,352,342, Pitcairn disclosed an autogyro with blades which were hinged relative to the hub.

Even though the principal focus for low speed flight appears to have shifted to helicopters, there appears to have been some continuing interest in autogyro craft. However, development efforts appear to have largely been restricted to refinements of the early patented systems. For instance, Salisbury, et al., U.S. Pat. No. 1,838,327, showed a system to change the lift to drag response of a rotary wing.

The value of being able to elevate a sensor for surveillance is recognized in the art. Flight vehicles offer the opportunity to elevate a sensor to great advantage, the earliest military examples of this being the use of tethered balloons.

Tethered balloons and aerostats remain in use today for surveillance, but can require significant resources to transport, set-up, maintain, and tear down, limiting their utility to specific applications. Great reliance has instead been placed on the use of piloted surveillance aircraft (such as airplanes and helicopters. While aircraft operations offer tremendous mobility and flexibility, they also come at significant expense, significant facility and logistical burdens, and with limited flight endurance.

BRIEF DESCRIPTION OF DRAWINGS

FIG. 6 is a schematic view of an air vehicle during takeoff according to an example of the present invention;

FIG. 7 is a schematic view of an air vehicle during flight according to an example of the present invention;

FIGS. 27A-27D are schematic views of an extended and folded air vehicle according to an example of the present invention.

DETAILED DESCRIPTION

Figure 1:
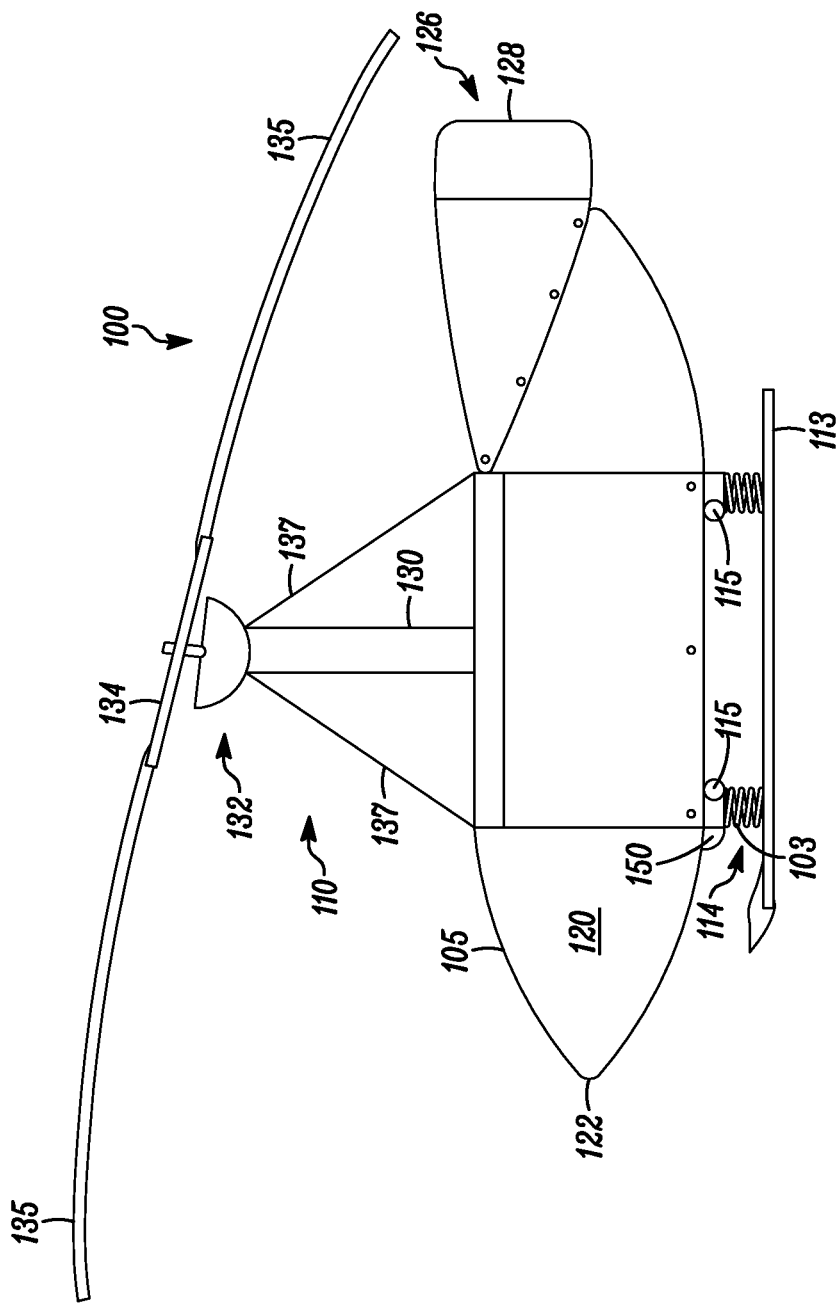
FIG. 1 is a side view of an air vehicle according to an example of the present invention.

The present inventors have recognized the need for improved electronic systems in the maritime and surveillance areas. The unmanned air vehicle as described herein can be used to improve performance in the maritime and surveillance areas.

The present inventors have recognized the need for more efficient delivery of cargo and services and addressed this need through the use of unmanned autogyros. Modern commerce and military plans require efficient delivery of needed supplies, equipment, and parts. However, air delivery is limited by the weight and bulk that a given aircraft can carry. For example, a Cessna 172 with a single pilot can carry a payload of 400 lb. or 30 cubic feet; a Cessna 182 with a single pilot can carry a payload of 500 lb. or 32 cubic ft.; a Caravan 650 Super Cargomaster with two pilots can carry a payload of 2,500 lb. or 451 cubic ft. Helicopters also have limited cargo capacity: a Robinson 44 with a single pilot can carry a maximum payload of 500 lb. in 25 cubic ft.; a Robinson 22 with a single pilot can carry a maximum payload of 200 lb. in 16 cubic ft.; a Bell 206B with a single pilot can carry a maximum payload of 700 lb. in 30 cubic ft. Much of a helicopter's cargo capacity, either weight or volume, is taken up by a heavy engine, heavy transmission, tail rotor assembly, etc. Moreover, such a delivery method is expensive as operating costs of a manned aircraft are quite high. With the above problem recognized, the inventors developed an unmanned aircraft that can deliver cargo in an efficient manner, e.g., more inexpensive per trip, per weight, and/or by volume. A towable air vehicle was developed, by the present inventors, that includes an autogyro, and hence its own lift. The air vehicle can act as a trailer to a powered aircraft. The present vehicle can carry cargo that is at least 100% of the volume that the towing aircraft can carry. Examples of the presently described vehicle can further carry about 75% or more of the weight of the cargo of the towing aircraft. Accordingly, a relatively small unmanned autogyro can carry sophisticated electronic devices for surveillance, for example, in a maritime environment or along a border.

Using autogyro technology with an on-board automated control system, the vehicle can fly safely behind a towing aircraft, boat, or land based motorized vehicle. In an example, the control system can automatically land the air vehicle. In another example, the control system can sense various flight and air vehicle characteristics and automatically control the settings of the air vehicle, including the autogyro means for different phases of flight, e.g., takeoff, towed flight, free flight, and landing. The control system can further control other electronic devices onboard the air vehicle. The other electronic devices can be related to surveillance or deceptive electronic countermeasures.

In an aspect of the present invention, an air vehicle includes three components, namely, a container to hold cargo, an autogyro assembly or means connected to the container and to provide flight characteristics, and electronics including a controller to control operation of the autogyro assembly for unmanned flight, which can include at least one of takeoff, towed flight, free flight, and landing. The container includes a connection that connects the air vehicle to a unit that provides forward motive force to power the autogyro assembly. Examples of such units includes a boat, submarine, aircraft, automobile, winch, motorcycle, or other apparatus that can move the autogyro forward to provide the lift required by the air vehicle. In an example, the autogyro assembly includes a mast extending from the container, a rotatable hub on an end of the mast, and a plurality of blades, connected to the hub, for rotation to provide lift to the air vehicle. The autogyro assembly can include a rotor shaft position sensing system. In an example, an electrical pre-rotor rotates the blades prior to lift off to assist in take off. The electrical pre-rotor does not have enough power to sustain flight of the vehicle in an example. The container supports sensor systems that can be adapted to indicate load, weight and balance of the cargo supported by the container. In an example, the sensor system can be an airspeed indicator sensor. The sensor system can include a position sensing system. The sensor system can include Pitot sensors, which sense the air speed. In some embodiments, the container is not required and a frame is all that is needed. The sensor systems can also include surveillance systems, radar systems, electronic protection, and other electronic warfare systems.

The controller can sense various flight characteristics and process the sensed data to control the rotational speed of the hub or blades, angle of attack of the hub and plurality of rotating blades, and the pitch of the blades. In an example, the controller senses forward motion, e.g., velocity or acceleration, to control the autogyro assembly. In an example, the controller can receive signals from remote transmitters, e.g., a land based transmitter or from the towing aircraft. The controller can adjust components of the autogyro assembly using the received signal. In an example, the controller outputs blade pitch control signals to operate actuators that set the angle of blades. In an example, the controller outputs control signals to operate actuators that control the position of at least one of vertical stabilizers and horizontal stabilizers.

The container can enclose a volume within a body to hold cargo. The body is defined by a frame on which a skin is fixed. An undercarriage is provided that contacts the ground for landings and takeoffs. A rear stabilizer is provided to improve the flight characteristics of the air vehicle. In an example, the undercarriage includes a trolley that contacts the ground to provide mobility and is removable from rest of the container. In an example, the container encloses the electronics for the sensor and communication devices against adverse weather. The container, in some embodiments, is sized to only hold the electronics and is not for carrying significant payloads.

For some surveillance applications, it is possible to achieve the utility and long endurance of a tethered lifting body, but utilizing an unpowered rotor. The result is a platform that remains physically small by comparison to lighter than air vehicles. Specifically, by tethering the aircraft, an unpowered rotor can provide the necessary lift given sufficient wind speed. With sufficient wind speed, a properly sized unpowered autogyro that is tethered to a fixed location can be used to lift itself and a desired surveillance payload.

Given that winds aloft are quite dependable at most locations, embodiments of the present invention describe a tethered autogyro that can be employed to lift a sensor for the conduct of stationary surveillance for indefinite and extended periods of time. Specifically, the autogyro flight vehicle is sized to enable sufficient lift to enable sustained operation at altitude with a suitable sensor payload and tether. Stored onboard electric power is applied to the rotor for the purpose of climb to altitude to reach the necessary winds, and, if needed to control descent and landing. The tether is sized to secure the flight vehicle to the selected ground location, and to allow for transmission of the electrical power and signals required to manage the vehicle and payload once at altitude. A powered winch may be used to manage the tether during launch and recovery. Anti-torque can be used to offset the rotor torque during powered flight segments. During flight, takeoff and landing, electrically-actuated cyclic rotor inputs are used to stabilize the vehicle attitude. The capability to produce forward thrust enables positive control over the vehicle trajectory during launch and recovery.

With this system being fully automated, it will be possible to transport it to a desired location in a small vehicle (e.g., truck, small boat or other water craft), to have a small crew (e.g. two persons) successfully launch the vehicle in a short period of time (e.g. less than one hour), to establish stationary surveillance aloft and sustain it for an indefinite period of time, and when required, to quickly recover the vehicle and move out of the area. Smaller versions may be man packable.

Figure 2:
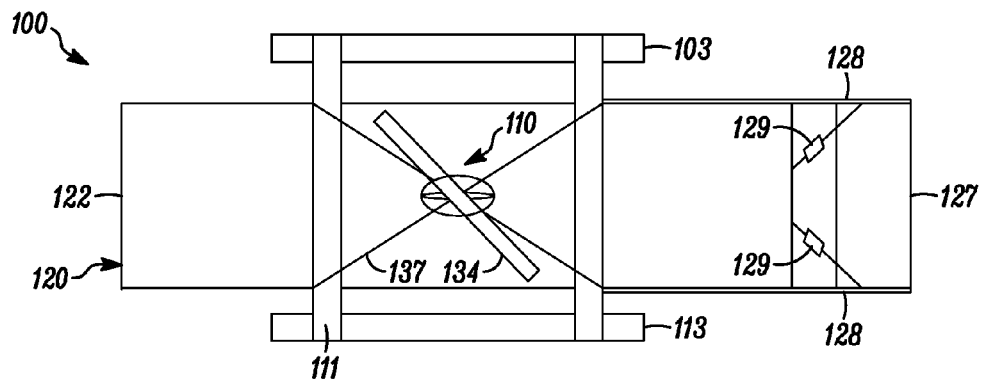
FIG. 2 is a top view of an air vehicle according to an example of the present invention.
Figure 3:
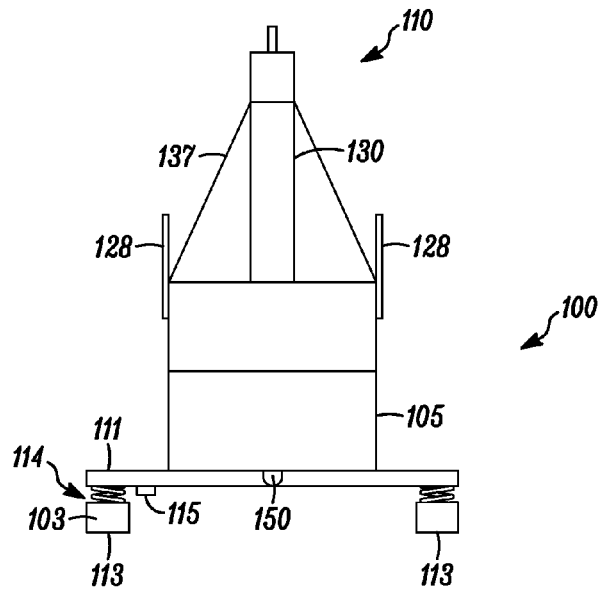
FIG. 3 is a front view of an air vehicle according to an example of the present invention.

FIGS. 1, 2, and 3A show a side view, a top view, and a front view of an unmanned air vehicle 100. The unmanned air vehicle 100 is an autogyro vehicle that flies based at least in part on the lift created by rotating airfoil blades. The operating principal is the same as a fixed wing airplane with the airfoil blades rotating. The air vehicle 100 includes an undercarriage 103 on which is supported a container 105 and autogyro assembly 110. The undercarriage 103 is to contact the ground and support the container 105. The undercarriage 103 can be simple feet that are designed to contact the ground. The undercarriage 103 as shown includes a frame 111 on which are mounted mobility devices 113 that contact the ground and allow the vehicle 100 to move on the ground. The mobility devices 113 can include wheels, pontoons, and/or skis (as shown). The frame 111 supports the container 105. In a further example, the undercarriage 103 is releasably mounted to a trolley on which is mounted mobility device(s). The undercarriage 103 can further include a plurality of supports 114, e.g., cross members at the front and rear of the container 105 from which legs extend downwardly from the container. The mobility devices 113 are fixed at the downward ends of the legs. Supports 114 can include sensors 115 that measure the weight or displacement at each of the legs. Sensors 115 communicate the sensed data to the controller, e.g., controller 401.

The container 105 is shown as an enclosed body 120 that defines an interior volume in which cargo or electronic means can be stored. In an example, the container 105 includes a platform on which cargo is stored. The body 120 can be fabricated out of wood, composites, carbon fiber, plastic, polymer or lightweight metal. These rigid materials can form a frame on which a skin is fixed. The wood body can be a limited use body, e.g., one-time use. The container 105 can have a high strength internal frame with a lightweight skin fixed thereto. The skin can be a fabric, a thin plastic, a carbon fiber fabric, or a thin, lightweight metal skin. The enclosed body 120 has essentially smooth outer surfaces and a narrowed, leading nose 122. The body can further be a monocoque design, whereby the external skin supports the structural load. In an example, the body has a semi-monocoque design in which the body is partially supported by the outer skin and can have some frame elements that also support the structural load. The body 120 can further include doors that can be opened for loading and securely closed during flight. The doors can be positioned on the sides, in the nose, or in the tail. The doors can further be designed to be opened during flight to release various means for counter electronic warfare or to expose sensors to the open air.

A stabilizer system 126 is on the body 120 to assist in flight. Here as shown, the stabilizer system is a rear stabilizer. The rear stabilizer 126 includes a central horizontal tailplane 127, which can include an elevator that is moveable vertically by an actuator, which is controlled by the controller, and a vertical fin 128 is mounted to a respective end of the tailplane 127. The vertical fins 128 can be fixed. In an example, the vertical fins 128 are connected to actuators 129 that move the vertical fins horizontally in response to signals from the controller. The horizontal tailplane 127 is spaced from the rear of the body 120 such that a gap is between the rearward edge of the body 120 and the leading edge of the tailplane 127. It will be recognized that the stabilizer system 126 can be shaped or designed to better stabilize the vehicle based on the various shapes of the body, loads it will carry, towing power of the towing vehicle (e.g., boat, aircraft or automobile), and turbulence. The stabilizer system 126 can be positioned to best aid in stable flight of the vehicle 100. In various example, the stabilizer system can include a T-tail, J-tail, V-tail, cruciform tail, twin tail, among others.

In an example, an air vehicle having a container 105 that can be towed by Cessna 172, Super Cub, or other similar aircraft can hold about 1,000 lbs (+/−100 lbs.) of cargo in a volume of about 154 cubic ft. (+/−10 cubic feet). The cargo volume of the container store cargo of a maximum length of about 12 ft. (+/− one foot). In this example, the body 120 has a length, nose to rear of 18.5 feet and a height of 5 feet. The rear stabilizer 126 extends partly onto the body and is attached thereto by a plurality of connections on each of the vertical fins 128. The rear stabilizer 126 adds about two feet onto the length of the vehicle. Smaller containers can be used to house electronic systems and can be towed by boats, e.g., patrol boats (regular and river), special operations watercraft, aircraft carriers, cruisers, destroyers, frigates, corvettes, submarines, and amphibious assault ships. Such an air vehicle being towed behind a watercraft would increase the detection range to determine potential threats at an earlier opportunity and/or increase the time for identification of other airborne vehicles, ground vehicles or watercraft.

The container 105 further includes a connection 150 at which a tow line (not shown in FIG. 1, 2, or 3A) can be attached so that a tug craft (towing means) can provide motive force to the vehicle 100. In an example, the connection 150 can be a glider tow connection. Examples of a glider tow connection can be found in U.S. Pat. Nos. 2,425,309; 2,453,139; 2,520,620; and 2,894,763, which are incorporated herein by reference for any purpose. However, if any of these incorporated patents conflict with any of the present disclosure, the present disclosure controls interpretation. One example of a tow connection 150 is a hook mounted on the front of the vehicle 100, e.g., on the container 120 or the frame 103. A similar connection can be on the rear of the tug or towing craft. In an example, the hook is on the towing craft (e.g., the bottom of the tug aircraft, specifically, on the tailwheel structure or on the bottom of the fuselage). In the case of a water or ground based towing craft, the hook would be on top or above the towing craft. In an example, the hook would be at a high point on a watercraft to reduce the chance of entanglement with the tow line. In an example, the hook would be at an aft location (stern) on the watercraft to reduce the chance of entanglement with the tow line. The hook can be part of a winch that can control the length of the line extending out from the craft to the air craft 100. Examples of the hook include a Schweizer hitch, a Tost hitch, and an Ottfur hook. The hook is to hold an end of the tow line, for example, a ring fixed to an end of the tow line. On the tug craft the hook is open toward the front of the aircraft and the ring and tow line extend rearward from the tug craft. A release mechanism allows a person in the craft to release the ring from the hook by moving the hook so that it opens from the tow position to a release position such that the hook is open more rearward than in the tow position. The release mechanism can be linkage connected by a release line to the pilot who can change position of the hook by moving a lever connected to the release line. The same mechanisms, e.g., hook, and release mechanism, are mounted on the vehicle 100. The hook on the vehicle 100 is open rearward so that the tow line is secure during flight.

The tow line and/or the rings can have a weak link that will fail if the forces between the air vehicle 100 and the tug craft are too great. These weak links are designed to fail and release the air vehicle 100 if a force between the tug craft and the vehicle may result in catastrophic failure for either the vehicle or the tug craft. In the event of a weak link release of the air vehicle from the towing craft, the controller on board the air vehicle 100 and execute flight instructions, which can be stored in on-board memory, to fly the vehicle 100.

The tow line between the tug aircraft and the vehicle 100 can provide electrical transmissions, e.g., electrical power, from the tug craft to the vehicle 100. In an example, the tow line can further provide bidirectional communication between the tug craft and the vehicle 100, in particular to the vehicle controller. The electrical transmissions can be secure data-by-wire transmissions that may be more secure than broadcast radio communication. The electrical transmissions can include radar data, optical data, weather data, surveillance data, or other electronic warfare data.

The autogyro assembly or means 110 is fixed to a central location on the body 105. The autogyro assembly 110 includes an upwardly extending mast 130. A hub 132 is rotatably mounted on the upward end of the mast 130. The hub 132 supports a plurality of blade supports 134 on which airfoil blades 135 are mounted. The blades are shown in FIG. 1 and not FIGS. 2 and 3 for clarity. The blades 135 can be manufactured from aluminum, honeycombed aluminum, composite laminates of resins, fiber glass, and/or other natural materials, and/or carbon fiber. The blade supports 134, and hence, blades, are provided in opposed pairs. In an example, the blades are an equal number of opposed pairs of blades. In an example, the number of blades is four (two pairs of opposed blades). In an example, the blades can be of any number of blades that are equally spaced in the plane of rotation. In an example, three blades are provided and are spaced about 120 degrees from each other. The airfoil blades 135 have a cross sectional shape that resembles an airplane wing to provide lift during flight. The autogyro assembly 110 includes actuators that control the rotational position of the blades 135. Stanchions or guide wires 137 extend from the body 105 to the top of the mast 130 to stabilize the mast during flight and from the forces exerted thereon by the rotation of the hub 132 and blades 135.

The airfoil blades 135 can be retracted to be adjacent the hub or removed from the hub 132 for further transport of the vehicle or recovery of at least some components of the vehicle. Examples of further transport can include sailing the vehicle on a boat, loading the vehicle on a truck, or loading the vehicle inside an airplane. In an example, the airfoil blades 135 are removed, as desired, from the hub 134. The airfoil blades 135 can be unitary and single elongate bodies. These bodies can be made from metal, natural composites, wood, carbon fiber layers, resins, plastics, or semisynthetic organic amorphous solid materials, polymers, and combinations thereof. The blades 135 can then be transported back to an airfield and reused on a different autogyro assembly. In an example, the blades 135 from a plurality of vehicles are stored in one of the vehicles for a return flight from its mission location to a home airfield. In this example, only one of the vehicles 100 need be flown from its destination to retrieve the more costly parts of other vehicles. Other components such as the controller, sensors, and hub can also be removed from vehicles that will not be recovered and stored in a vehicle that will be recovered.

In an example, the airfoil blades 135 are foldable such that they have an extended position for flight and a retracted position for non-flight. An example of retractable airfoil blades is described in U.S. Patent Publication No. 2009/0081043, which is incorporated herein by reference for any purpose. However, if U.S. Patent Publication No. 2009/0081043 conflicts with any of the present disclosure, the present disclosure controls interpretation. Thus, during ground transportation or during other non-flight times the blades 135 are retracted such that the airfoil blades do not interfere with ground crews or experience forces on the blades during ground movement. The airfoil blades 135 can further be folded for storage on the deck of a ship or below decks in a maritime use of the air vehicle 100.

The airfoil blades 135 have at least one section that has an airfoil profile. This section of the blade 135 has a shape when viewed in cross-section that has a rounded leading edge and a sharp, pointed trailing edge. A chord is defined from the leading edge to the trailing edge. The chord asymmetrically divides blade into an upper camber and a lower camber. The upper camber is greater than the lower camber. Moreover, the upper and lower cambers can vary along the length of the section and entire airfoil blade. The airfoil blade moves through the air and the passage of air over the blade produces a force perpendicular to the motion called lift. The chord defines the angle of attack for that section of the blade. The angle of attack can be defined as the angle between the chord and a vector representing the relative motion between the aircraft and the atmosphere. Since an airfoil blade can have various shapes, a chord line along the entire length of the airfoil blade may not be uniformly definable and may change along the length of the blade.

Figure 4A:
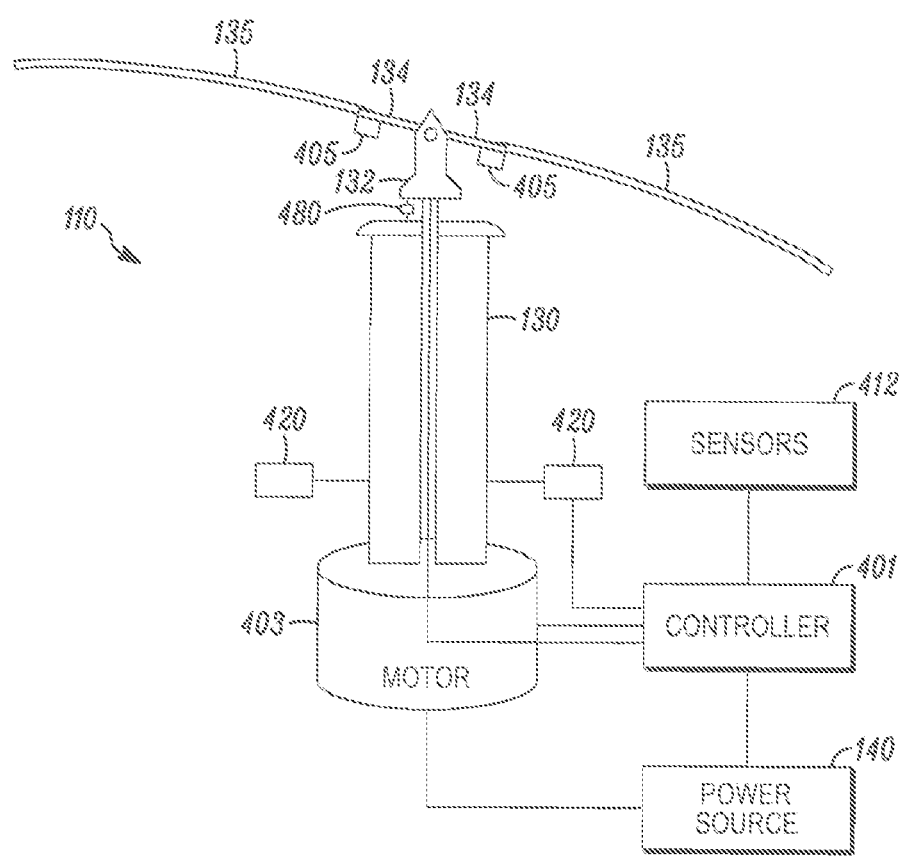
FIG. 4A is a schematic view of components of an air vehicle according to an example of the present invention.

FIG. 4A shows a schematic view of the autogyro assembly 110, which includes the mast 130, hub 132, blade supports 134, and airfoil blades 135. The autogyro assembly 110 further includes a controller 401, an electrical motor 403, a plurality of actuators 405, and a power source 410 connected to each device in need of electrical power. The controller 401 is in communication with the electrical motor 401 and actuators 405 to control operation thereof. The controller 401 can further communicate with sensors 412 to receive performance data that can be used to control components of the autogyro assembly. In an example, the controller 401 controls operation of various moveable components such that the vehicle 100 flies unmanned. In this example unmanned means that there is no human being on board the vehicle 100 to control flight of the vehicle 100. The controller 401 can further control flight of the vehicle 100 being towed by another aircraft.

The controller 401 can control operation of the electrical motor 403 that rotates a drive shaft connected to the hub 132 to rotate the airfoil blades 135. The motor 403 adds rotational power to the rotor system to reduce drag and assist in the lift provided by the airfoil blades 135. This can help the vehicle 100 achieve flight. The motor 403, in an example, does not provide sufficient power to sustain flight of the air vehicle 100. In an example, the motor 403 can provide sufficient power to the rotating airfoil blades 135 such that the vehicle 100 can launch the vehicle in a cargo-free state. The motor 403 can further provide rotational power that can be used to reduce blade angle of attack, prevent rotor decay of RPM speed, improve landing glide slope and decrease the decent speed. These features may be described in greater detail with regard to operational of the vehicle, e.g. FIGS. 6-9.

The controller 401 controls operation of the actuators 405, which control the tilt of the airfoil blades 135. During prerotation of the blades 135 prior to takeoff, the actuators 135 hold the blades in a flat position that has a very low angle of incidence, e.g., 0 degrees, less than 5 degrees, or less than 10 degrees. Prerotation is the rotation of the airfoil blades prior to take off or rotation of the blades by the onboard motor. Once the blades 135 are at a desired rotational speed, the actuators 405 can drive the blades to a takeoff position with an angle of incidence greater than the prerotation, flat position and a flight position. Once the vehicle 100 is in flight, the actuators 405 can reduce the angle of incidence relative to the takeoff angle to the flight position. The flight position of the actuators 405 and blades 135 is greater than the prerotation position. In another example, the actuators 405 release the blades 135 during flight so they can find the optimum angle of incidence without influence by the actuators 405.

In some embodiments, there is no pre-rotation of the blades by an on-board motor; instead the forward movement of the vehicle relative to the air (wind or forward movement by the towing craft) will start the rotation of the blades.

In a flight profile of the vehicle 100, the flat, prerotation position of the blades 135 results in a zero angle of incidence to reduce drag on the blades during prerotation such that a smaller motor and power source can be used. At takeoff, the blades 135 are set at an angle of incidence of about 12 degrees. Each of the degree measurements in this paragraph can be in a range of +/− one degree. During flight, the blades 135 are set at an angle of incidence of about 5 degrees. During the approach, the blades 135 are set at an angle of incidence of about 12 degrees. During the landing the blades 135 are set at an angle of incidence of about 20 degrees or more.

The air vehicle 100 can result in a 50% increase or more in cargo capacity relative to the towing craft. In an example, the vehicle 100 can tow about half of the gross weight of the towing aircraft. In some examples, the air vehicle 100 results in a 75% to 100% increase in cargo capacity with cargo capacity measured by weight. A further benefit is the air vehicle having a body that can hold larger, either in length, width, or height than the towing aircraft as the vehicle 100 does not have all of the design constraints that a manned aircraft must have.

As the air vehicle 100 can fly in an unmanned configuration with a significant cargo relative to its own size and weight, it can be made small when it only carrying electronic or optical surveillance equipment. In an example, the air vehicle can have a mass of about 25 and up to provide adequate electronic surveillance. In some examples, the air vehicle 100 can be in the range of about 25-700 kg. This reduces mass and size can further reduce the radar image of the vehicle 100 and the ability to optically detect the vehicle 100 by a person or through electro-optical means.

An actuator 420 is connected to the mast 130 to move the mast longitudinally and laterally to correct for unbalanced loads in the container. In an example, there is a plurality of actuators 420, which can be screw jacks that are electrically powered. Load sensors, e.g., sensors 115, sense the deflection of container on the frame and feed this data to the controller 401. The controller 401 calculates the load positioning, including empty weight (for different vehicle 100 configurations) and center of gravity. The controller 401 can indicate to the ground crew how much more cargo, by weight, the vehicle can safely fly. The controller 401 further calculates the center of gravity based on data from the load sensors. The controller can engage the actuator(s) 420 to move the autogyro assembly 110 forward and aft, and left or right to keep the mast and hub, and hence the point of rotation of the blades, as close to the center of gravity as possible. In an example, the actuators 420 are jack-screws that precisely position the mast 130. If the autogyro assembly 110 cannot be moved to sufficiently to center the autogyro assembly 110, e.g. mast and hub, at the center of gravity, then the controller 401 will issue an error message to the ground crew. Messages to the ground crew can be displayed on video display 510, stored in memory 504 or 506 or sent view network interface device 520 over a network 526 to other devices, e.g., handheld devices, for display.

Figure 4B:
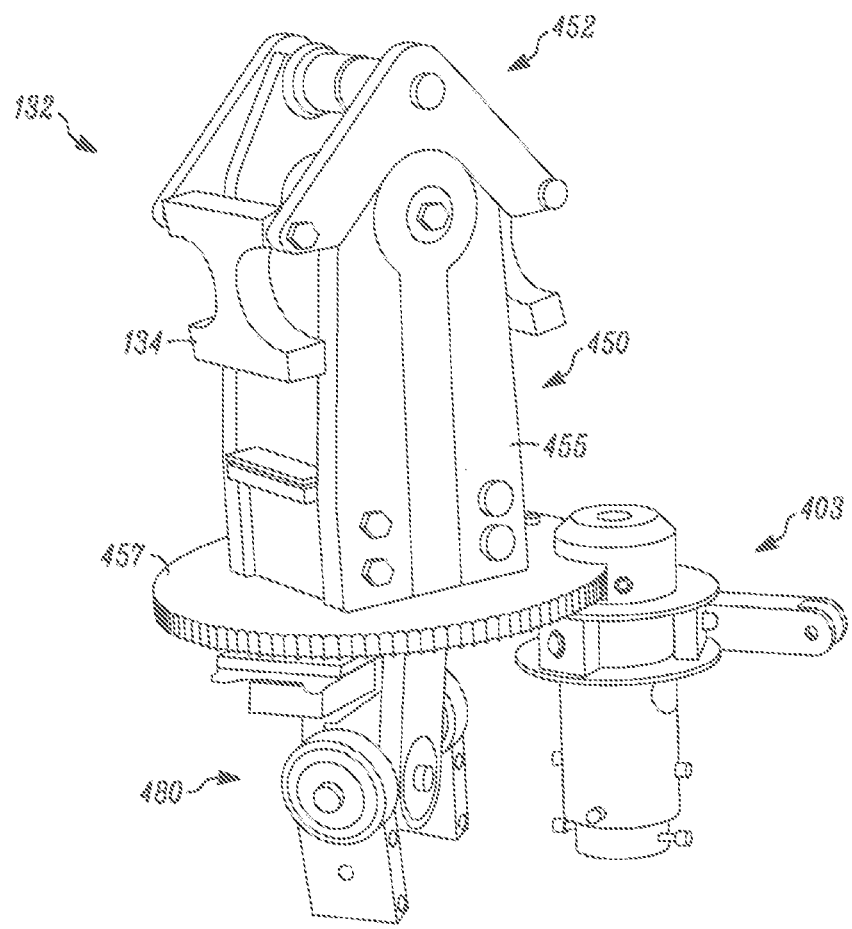
FIG. 4B is a schematic view of components of an air vehicle according to an example of the present invention.

Referring now to FIG. 4B, an example hub 132 is shown that includes a main body 450 that includes top 452 that defines an opening in which the airfoil blades 136 or blade supports 134 are fixed. Shock bumpers 455 engage the top of the airfoil blades 136 or blade supports 134 in the body 450 to prevent mast bumping. In an example, the body 450 is fixed to a drive gear 457 that can be engaged by the motor 403 through a drive shaft 458 or manually to rotate the hub body 450 and the blades attached thereto. In another example, the main body 450 is fixed on a universal joint 460 that can be fixed to a drive shaft that extends in the mast from the motor 403 to the hub 132. In another example, the main body 450 and drive gear 457 rotate on the joint 460. The joint 460 allows the main body 450 to be tilted vertically such that the airfoil blade is tilts downwardly from the front to the back to create and angle of incidence. An actuator 480 controls the amount of tilt of the airfoil blades. The controller 401, based on its application of its stored rules and the sensor inputs, sends signals to the actuator 480 to control the angle of incidence of the airfoil blades. In an example, the actuator 480 is positioned at the front of the hub 132. Thus, the actuator 480 controls the pivot of the hub on axis 482.

Figure 5A:
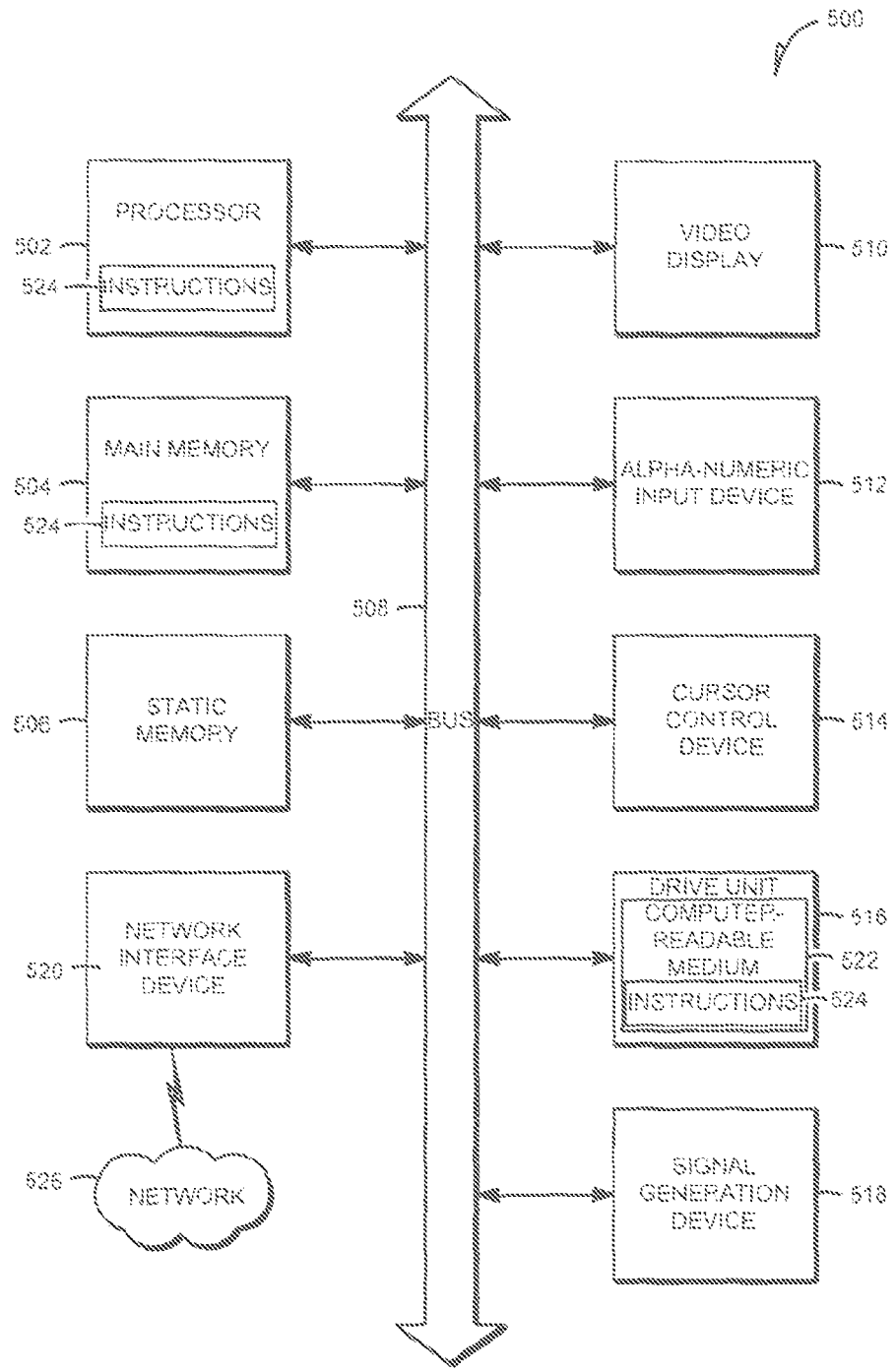
FIG. 5A is a schematic view of a controller for the air vehicle according to an example of the present invention.

FIG. 5A (see view 500) shows an example of the controller 401 within which a set of instructions are to be executed causing the vehicle 100 to perform any one or more of the methods, processes, operations or methodologies discussed herein.

In an example embodiment, the controller 401 operates as a standalone device or may be connected (e.g., networked) to other controllers. In a networked deployment, the one controller can operate in the capacity of a server (master controller) or a client in server-client network environment, or as a peer machine in a peer-to-peer (or distributed) network environment. Further, while only a single controller is illustrated, the term "controller" shall also be taken to include any collection of devices that individually or jointly execute a set (or multiple sets) of instructions to perform any one or more of the methodologies discussed herein.

The example controller 401 includes a processor 502 (e.g., a central processing unit (CPU) or application specific integrated chip (ASIC)), a main memory 504, and a static memory 506, which communicate with each other via a bus 508. The controller 401 can include a video display unit 510 (e.g., a liquid crystal display (LCD) or a cathode ray tube (CRT)). The controller 401 also includes an alphanumeric input device 512 (e.g., a keyboard), a cursor control device 514 (e.g., a mouse), a storage drive unit 516 (disk drive or solid state drive), a signal generation device 518 (e.g., a speaker, optical output, etc.), and an interface device 520.

The drive unit 516 includes a machine-readable medium 522 on which is stored one or more sets of instructions (e.g., software 524) embodying any one or more of the methodologies or functions described herein. The software 524 can also reside, completely or at least partially, within the main memory 504 and/or within the processor 502 during execution thereof by the controller 401, the main memory 504 and the processor 502 also constituting machine-readable media.

The software 524 can further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by a computer or computing device, e.g., controller 401, or other machine and that cause the machine to perform any one or more of the methodologies shown in the various embodiments of the present invention. The term "machine-readable medium" shall accordingly be taken to include, but not be limited to, solid-state memories and optical and magnetic media. Carrier wave signals can further communicate the instructions to the controller.

The interface device 520 is further configured to receive radio frequency signals. These signals can trigger certain operations to be commanded by the controller 401. In an example, a signal can be sent from the motive unit, e.g., an airplane, ship, boat, land vehicle or a helicopter, and received by the interface device 520.

The controller 401 executes flight control instructions without the need for an on-board pilot. The controller 401 includes multiple flight rules for different phases of flight, i.e., takeoff, cruise, unaided flight, and landing phases. The controller 401 controls the pitch for each of these different phases by data from the sensors and applying this data using the flight control instructions. Pitch is the position of the plane in which the blades travel relative to a horizontal plane (essentially parallel to the ground).

The controller 401 can further store data and instructions for autonomous return flight. The controller 401 can store the weight of vehicle 100 absent cargo. As the cargo can be up to about 80% of the gross weight of the vehicle 100 during a delivery flight, it is envisioned that the motor 403 may be able to rotate the blades 135 to achieve take-off. In an example, the vehicle 100 is positioned so that it faces into a headwind. The headwind provides a relative forward windspeed against the airfoil blades 135. The controller 401 instructs the motor to rotate the blades and the vehicle can be airborne. Another example of self flight is described below with reference to FIG. 11, which can be used in conjunction with the present example. Once airborne, the controller 401 can sense the position of the vehicle 100, for example, using a global navigation satellite system (GNSS) such as Global Positioning System (GPS), Beidou, COMPASS, Galileo, GLONASS, Indian Regional Navigational Satellite System (IRNSS), or QZSS. The navigational system can include a receiver that receives differential correction signals in North American from the FAA's WAAS system.

Figure 5B:
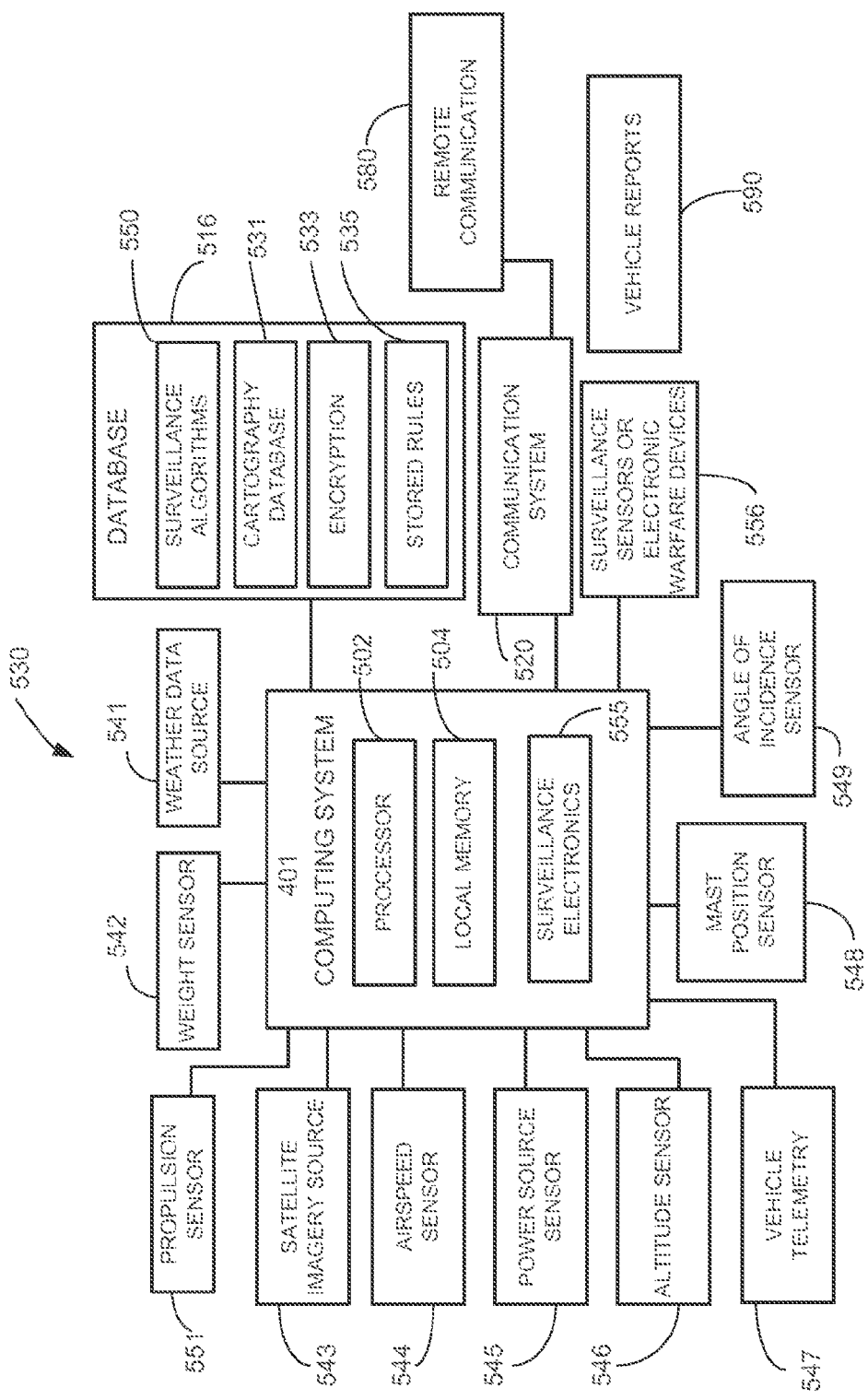
FIG. 5B is a schematic view of a controller and sensor assembly for the air vehicle according to an example of the present invention.

FIG. 5B shows an example of a flight system 530, which includes a controller 401 in communication with a data base 516 and a communication system 590. A plurality of sensors are to sense various flight data inputs, communicate the sensed data to the controller 401 for processing using the processor or for storage in the database 516, and for sensor or performing surveillance and/or electronic warfare. As described herein the controller 401 includes processor 502 and local memory 504. Database 516 is protectively mounted with the controller in a black box that secures the database and processor from harm during takeoffs, landing, non-authorized intrusions, and unscheduled landings. The database 516 can include a cartography database 531 that stores the terrain information that is or could be part of the vehicles flight path.

The cartography database 531 can store data relating to physical traits, including but not limited to roads, land masses, rivers, lakes, ponds, groundcover, satellite imagery or abstract data including, but not limited to, toponyms or political boundaries. Encryption rules and data 533 can also be stored in the database. The encryption can be used for communication with other vehicles or the towing craft. Flight rules 535 are stored in the database. The flight rules 535 can be adapted for the type of flight and to the towing craft. For example, being towed by an aircraft would be assigned different flight rules than being towed by a ship or boat. A flight rules applied by the controller can also change for tethered flight or released/untethered flight. The processor 502 can access the cartography database 531, encryption rules or data 533, and other stored rules 535 to calculate a desired flight path and or correct for various obstacles or flight path deviations.

The database 516 can also store surveillance algorithms 550 that can be implemented in the computing or electronics system to perform surveillance or electronic warfare tactics. In an example, the surveillance algorithms 550 can implement electronic protection such that the vehicle 100 can perform to protect itself, and the tow craft. As a result, personnel, facilities and equipment can be protected adverse effects of friendly or enemy employment of electronic warfare that degrade, neutralize or destroy friendly combat capability. The algorithms 550 can implement passive electronic surveillance. The algorithms 550 can implement active electronic surveillance. The algorithms 550 can further implement evasive maneuvers by the vehicle 100. The algorithms 550 can further implement measures that are designed to attract the attention of a potentially hostile engagement in an attempt to distract the enemy from the tow craft that may have personnel onboard.

The controller 401, and in an embodiment the processor, can invoke various rules that can be stored in a memory and read by the controller. The loading of these flight rules sets the controller 401 to a specific machine. In an example, the controller 401 checks the "if, and, or" file for altitude restrictions, obstacles, restricted space during the planning phase. As used herein a file is code that can be stored in a machine readable form and transmitted so as to be read and loaded into the controller 401. During the "Takeoff, In Flight and Landing" phases the controller checks the flight sensor package including but not limited to: rotor rpm sensor, rotor disk angle of attack sensor, load on wheels sensors, tow bridle angle horizontal and lateral position sensor, tow bridal load % rating, horizontal stabilizer angle and trail position sensors.

Additional control rules and instructions include waypoint takeoff rules that result in the present position, e.g., as GPS grid coordinates, being entered into and stored in the controller 401. In an example, at least one waypoint is entered into the controller 401. In an example, additional waypoints are entered. Any number of waypoint coordinates can be entered. These waypoints generally define the flight path for the air vehicle 100. Alternate flight path waypoints can also be stored in the controller 401. Separate waypoints can be stored for the landing sequence. Known obstacles along the intended flight path (as can be defined by the waypoints) can be stored in the controller for each stored flight path and landing path. The controller 401 uses stored flight route (e.g., path), weight of the air vehicle as indicated by the landing gear load sensors or determined by an external scale, and flight data entered by the mission planning computer to recommend route changes to maintain the recommended vertical separation and ground clearance requirements. In an example, the mission planning computer can calculate these route changes and download them to the controller 401.

The controller 401 is connected to a takeoff sensor that senses when the load is removed from the landing gear sensor. The controller 401 than can change from a takeoff setting to a flight setting. The controller can delay the change to a flight setting until a certain altitude is reached. The controller 401 is also connected to a forward air speed that can indicate when never exceed velocity ($V_{NE}$) is achieved or when a stall velocity is being approached. If a stall velocity is imminent, the controller 401 can release the tow line if still attached to the tow aircraft. The controller 401 can also receive data relating to the rotor's revolution speed (e.g., RPM). In an example, the controller 401 receives this data and can calculate the current revolution speed as a percentage of maximum speed. If the maximum speed is reached, the controller 401 can instruct a brake system to slow the rotor speed. The controller can also act based on the rotor speed being too low, e.g., start the pre-rotor motor, release the tow line, calculate an emergency landing, etc. An emergency landing calculation can use the navigational system coordinates, stored maps (including population centers), requests for more information, calculation of a descent path, etc. The controller 401 can also receive data relating to operation of an actuator to control a rotor disk angle of attack exceed an operational threshold, e.g., retraction or extension at a given rate (e.g., % per second).

The controller 401 can further receive data from a forward flight sensor and tracking controls. The data can include at least one of: forward speed from which a percent (%) of flight speed can be calculated; rotor disk angle of attack (e.g., from a mast sensor); tow angle of a bridle (to which the tow line is connected), which can be used to determine the altitude difference relative to the towing aircraft; a lateral angle of the bridle (e.g., left and right of 180° line along the center line of the towing aircraft and air vehicle).

The controller 401 can also receive data relating to the stabilizer system, which data can include position (extension and contraction) of stabilizer component actuators. The controller can use this data to hold the air vehicle at a certain position (with a few degrees) behind the tow aircraft, tow ship, tow boat, or land based motive apparatus.

The controller 401 further uses sensed data for its flight rules related to a landing sequence. The landing sequence data can include but is not limited to actual forward airspeed from sensors, from which speed increase and decrease as well as position can be determined by the controller. The controller 401 can also receive data relating to whether the connection to the tow craft (e.g., the tow line) has been released. The controller 401 can receive data relating to rotor disk angle of attack to maintain bridal tension and vertical position. When in free flight the controller 401 can monitor the flight speed and once the bridal, e.g., the tow line, is release, then the ground radar on the air vehicle is activated. Using the ground radar or the forward velocity then controller 401 can autonomously control the position of the rotor disk (e.g., blade) angle actuator to control the position of the blades. Near the ground, e.g. within 100 feet or within 20 feet of the ground, the controller further increases the rotor disk (e.g., blade) angle. The increase in the rotor disk angle need not be linear and can increase faster as the ground approaches based on both the speed (decent and forward) and the distance to the ground. In an example, the controller further has the pre-rotor motor add power to the rotating blades immediately before the landing gear touches the ground. The controller can further use data from the load sensors to sense when touchdown occurs as the load will increase on these sensors at touchdown. When touchdown occurs, the controller 401 will cut power to the pre-rotor motor. The controller 401 can engage rotor brakes and or landing gear brakes. In an example, the controller 401 can autonomously perform, one or more of the preceding functions.

The controller 401 can further employ the above control of the air vehicle 100 flight even while still tethered. In an example, the air vehicle 100 is tethered a winch fixed to the motive apparatus. The winch can bring the vehicle toward the ground by winding in the tether line. As the vehicle 100 approaches the motive apparatus, e.g., a ship or a land vehicle, the controller 401 can still control the flight of the air vehicle 100.

A communication system 520 is in communication with the controller 401 and is adapted to communicate with other devices outside the air vehicle 100 for remote communication 580. The remote communication 580 can be with other vehicles 100, the tow aircraft, tow watercraft, land vehicle, or with ground based communication devices. Accordingly, real time external data and commands can be received by the controller 401 and flight performance can be altered by the controller interpreting this data and/or commands to generate control signals to controllable components in the air vehicle.

The sensors 541-549, 551 can be adapted to sense various data that relate to performance of the air vehicle 100 or add to surveillance/electronic warfare and electrically communicate the sensed data to the controller. The sensors 541-549, 551 can send raw sensor data to the controller 401 for interpretation. In an example, the sensors 541-549, 551 include processing circuits that interpret the raw data into data that can be used by the controller without further processing. A weather data source 541 senses various weather conditions, including visibility, rain, sun light, cloud cover, cloud height, barometric pressure, among others. In an example, the weather data source 541 is a sensor that senses the weather and can be mounted to the body of the vehicle such that the sensor can sense weather outside the vehicle body. A weight sensor 542 is adapted to sense the weight of the vehicle and can be mounted to at least one part of the frame. In an example, a weight sensor 542 is mounted to each of the legs of the vehicle frame to provide data from which the controller 401 can determine or derive the vehicle's center of gravity. A satellite imagery source 543 is adapted to sense satellite imagery data sent to the vehicle from remote device, such as directly from a satellite or from a tow craft. Thus current satellite imagery is available to the controller to make in flight corrections in essentially real time after takeoff. An airspeed sensor 544 senses the airspeed of the vehicle. A power source sensor 545 senses at least one of the consumption of power from the power source or the actual power stored in the power source. The controller can use the power source data to reduce power consumption if needed to complete the flight plan. An altitude sensor 546 senses the height of the vehicle above the ground. A vehicle telemetry sensor 547 senses the real-time position of the vehicle 100 and can use signals from global navigation systems. A mast position sensor 548 determines the position of the mast 130 of the autogyro assembly 100. The controller 401 can use the mast position sensor 548 to correctly position the mast 130 within in its range of movement in a horizontal plane of movement to position the mast in as close to the center gravity of the loaded vehicle as possible to improve the flight characteristics of the vehicle. A propulsion sensor 551 can sense operation of a motor and propeller in the embodiment where the vehicle has a propulsion system.

In operation the controller 401 can use stored data in the database 516 with sensed data from sensors 541-549, 551 to control flight of the vehicle when loaded with cargo or while being towed or in a surveillance/electronic warfare mode. The controller 401 can also operate as an autonomous vehicle return system using the stored data in the database 516 with sensed data from sensors 541-549, 551 to control flight and return an empty vehicle back to its designated home position. In an example, a tow craft such as a plane, a vehicle with a propulsion system, a balloon, boat, ship, truck, or other lift devices can provide forward movement such that an empty vehicle 100 can fly on its own or sufficient altitude that a dropping of the empty vehicle will result in sufficient forward movement so that the rotating blades provide lift to maintain the vehicle 100 in flight. If the vehicle 100 becomes untethered, it can return to the tow vehicle, e.g., a ship, and land on deck. In another example, the vehicle 100 is released from the tow vehicle and flies away from the tow vehicle in an attempt to decoy an adversary from the tow craft.

Surveillance or electronic warfare electronics 550 are part the computing or electronics package, e.g., controller 401, that are part of the air vehicle 100. The electronics 550 can include dedicated circuits to perform surveillance tasks, radar imaging, or other electronic protection tasks.

In an embodiment, the avionics package includes a micro controller coupled to various sensors to directly implement a navigational position-aided inertial navigation solution, to implement the feedback control laws, to command the vehicle actuators, to manage communications with a ground control station via a built-in spread-spectrum radio (or alternately over the tether, to monitor vehicle health, and to manage payload equipment. The rotorcraft variant may include an external magnetometer and a laser altimeter to produce an adaptive control system for automating rotorcraft flight from take-off to landing without dependence on high fidelity modeling of the vehicle dynamics. Adaptation is used to manage the system nonlinearities from hover to high-speed forward flight. Missions are executed using a series of predefined waypoints. Multiple missions can be stored, and the mission being executed switched in flight. Likewise, individual waypoints can be modified, or new waypoints inserted in flight. Further, the mission can be suspended at any time, with the vehicle automatically transitioning to a fully stabilized hover. A joystick input can then be used to "push" the vehicle around, up or down, or to change the heading so that the operator can explore the world without having a predefined mission. Operation in this manner is referred to as "steering mode". Fully automated take-off and landing makes it possible for an operator without remote-control piloting skills to manage flight operations. It is possible to take-off and land with a remote control pilot when desired, and to engage and disengage the autopilot while in flight.

A microcontroller can be used on the ground to manage communications with the vehicles (multiple vehicles can be operated by a single operator), and is housed in a small portable suitcase. A hand-held pilot's interface (e.g., in the style of a traditional hobby "RC" transmitter) attaches to the ground control station (GCS) with a cable and enables manually piloted flight of the vehicle when desired, or operation of the vehicle in "steering mode". Note that in the standard configuration, a single radio link with the vehicle is used for uplink of both the pilot's inputs and commands from the operator station, as well as for downlink of all vehicle telemetry data. The GCS also includes a satellite navigational positioning receiver (e.g., GPS receiver) so that the location of the operator can be correctly identified on map displays, and to provide differential navigational corrections to the vehicle when desired (differential navigational signalssan be beneficial to improve the navigation accuracy of the helicopter, but is not required to accomplish fully automated flight operations, including take-off and landing). A laptop or other computer can perform the ground control station function, and that in such case the laptop is also typically running software to create a graphical operator interface. The GCS can employ a stand-alone microcontroller to manage communications with the vehicle. A laptop is used to create a graphical operator interface, but because the laptop hardware/software is not used to manage the communications link, it is possible to network multiple laptops together at the ground station to support many possible tasks, and for any of those laptops to send commands to any of the vehicles being managed. Furthermore, if an application or the operating system on a laptop crashes, it does not affect the overall ability to maintain communications with the vehicle.

The radio equipment employed in the standard product is typically spread spectrum in the 902-928 MHz band at 1 Watt. However, other bands can be used. Manufacturers of such equipment claim typical performance of 12 miles line-of-sight with an omni-directional antenna, and 40 miles line-of-sight with directional antenna. It is possible to custom order modification of the standard radio equipment to obtain required frequencies, to externally boost the power level of the standard radio equipment, or to substitute alternate external radio equipment and bypass the internal equipment. For operations beyond line-of-sight, a commercial satellite communications link has been integrated and is available as a plug-in communications option.

A primary interface to the vehicle can be created in software that runs on a standard laptop, with software being instructions stored on a memory and executable by a machine, e.g., a computing device or electronic device. The instructions can be for a graphical interface for configuring one or more vehicles, importing and overlaying various map and image data, planning missions via waypoints entered on maps, interacting with vehicle's during flight to update, alter or suspend mission execution, monitoring each vehicle's health, archiving flight test data, and so on. Note that because the system can be operated in a fully autonomous mode, it is possible to define mission plans for fault events such as lost communications. In such case, the system will return to a pre-defined "lost communication waypoint", and after a timer expires to land at a designated landing location. The instructions and the computing device also allow a user to configure the control system in many complex and novel ways.

Of particular utility is the fact that the communications with each vehicle can be managed via an open and published communications standard for which a communications software developer's kit (e.g., Comm SDK) is made freely available. This means one can readily develop stand alone software applications tailored to specific needs and directly interface them with a commercial GCS product system. The system also includes software (machine executable instructions) for simulation of vehicle flight dynamics. The built in simulation model can be tailored to a vehicle's characteristics via input of model parameters, or an external representation of a vehicle's flight dynamics can be input to the system to produce real-time hardware-in-the-loop simulation with the avionics. Again this is accomplished with an open communications architecture for which a developer's kit is available. Thus it is possible to include in real-time hardware-in-the-loop simulation using an internal or external dynamic model, and to then export the state data for use in driving a three dimensional (3D) visualization of the world. Moreover, additional parameters can also be input, e.g., weather conditions, likely weather conditions, winds, or other data. This can be done with simulator visualization products, which can be customized to meet unique requirements. The pilot inputs can also be generated by an external device, and communicated to the vehicle (both in simulation or in actual flight) using features of the Com SDK.

The system also supports development of plug-ins (e.g., additional instructions) to the system, which enables development of custom features. One example of the use of a plug-in is an available video surveillance application that makes use of the helicopter navigation data to indicate the orientation and field of view of a gimbaled camera system on the map displays within the software interface, as well as providing the operator with live video feed and various controls for managing the camera system from within a single unified graphical operator interface.

Another option is the incorporation of high-precision, automated navigational (e.g., GPS) equipment. This plug-in option enables navigation accuracy down to the centimeter level for applications that demand very careful placement and control of the platform. This would be useful, for example, in the precision mapping of terrain height using the onboard laser altimeter, or with a more sophisticated ranging system (e.g. LIDAR).

On board flight equipment can also house power regulation for added components, a high-precision GPS receiver, a second spread spectrum radio link to increase overall communications bandwidth with the vehicle, and a wireless network connection useful at close range for loading and removing large data files from the vehicle. Such a component is extremely useful for collection of onboard sensor data at very high rates to support tasks such as system identification.

FIG. 6 shows a schematic view of the unmanned air vehicle 100 immediately after takeoff. The air vehicle 100, which does not have sufficient engine power to fly on its own, is connected to a tow craft 601, here shown as an airplane (however other tow craft or apparatus can be used), by a tow line 603. The controller sends an instruction so that the motor on board the vehicle begins rotation of the rotary wing. The rotary wing is rotated to at least 30% of its desired rotational speed before the towing aircraft begins its forward movement. In an example, the rotary wing is rotated up to 50% of its desired flight rotational speed. In some examples, the rotary wing is rotated up to 75%, or less than 100% of its desired flight rotational speed. Once the rotary wing is at a take-off speed, then the towing craft 601 can provide the initial propulsion to drive the vehicle forward such that air flows over the rotary wing, e.g., the blades 135. The vehicle 100 can contain cargo that results in the vehicle 100 having a gross vehicle weight that is up to about the same as the towing craft 601. During takeoff, the cargo body 105 rolls forward on the undercarriage 103, which includes a removable trolley that has wheels to allow the vehicle 100 to move forward at direction of the towing craft with an acceptable low resistance such that the towing craft and the air vehicle can achieve flight. In this example, the rotary wing of the vehicle provides enough lift to achieve flight shortly prior to the ascent of the towing craft 601. In the illustrated example, the vehicle 100 leaves the trolley on the ground. The vehicle undercarriage can include further landing devices such as wheels, skis, etc. In an example, the vehicle 100 takes off before the towing craft 601 to establish a flight formation with the vehicle 100 at a slightly higher altitude than the towing craft 601 at the time of takeoff.

In an example, the tow line 603 includes, in addition to being a mechanical connection between the towing craft 601 and the air vehicle 100, electrical communication lines between the towing craft 601 and the air vehicle 100. In some embodiments, the tow line 603 can include any number of ropes (synthetic or natural fibers), cables (metal or polymer), wires, and/or other connective structures that are or become known or practicable. In an example, the tow line 603 includes a power cable component that is electrically insulated from a signal line and the mechanical component. The tow line 603 can connect an electrical power source on the towing craft 601, e.g., an electrical generator or alternator which are driven by the aircraft motor, to the vehicle 100. Both the craft 601 and vehicle 100 can include outlets at which the electrical communication line of the tow line 603 is connected. The tow line 603 can further provide bidirectional communication between the towing aircraft 601 and the controller of the vehicle. The pilot or captain of the tow craft 601 can send data and/or commands to the controller of the vehicle 100. The craft 601 can further automatically send data to the controller of vehicle. As a result the sensors on the craft can provide additional data that can be used by the controller, e.g., 401, to control flight of the vehicle 100. In an example, the controller controls the angle of incidence of the rotating blades based at least in part on data communicated from the towing aircraft 601. The controller can further take into account data that is received from on-vehicle sensors as well.

FIG. 7 shows a schematic view of the unmanned air vehicle 100 in flight and being towed by the craft 601. The craft 601 continues to provide the thrust to move the vehicle 100 through the air such that the air passes over the rotary wing (e.g., airfoil blades 135), which provides the lift to the vehicle 100. In flight, the vehicle 100 typically flies at a slightly higher altitude than the craft 601. In an example, the vehicle 100 flies at an altitude whereat the turbulence from the towing craft does not affect the flight of the vehicle 100. The altitude of the towing craft 601 can be sent to the vehicle 100 over the tow line 603. In an example, the altitude of the towing craft can be sent over a wireless connection (e.g., communication components 520, 580) to the vehicle 100. The control system of the vehicle 100 can then set the altitude of the vehicle based on the data received from the towing craft 601. In an example, the control system (e.g., controller 401) of the vehicle can receive altitude data from sensors onboard the vehicle and set the flight altitude based on this data. The controller can set the angle of the rotor 701, which changes the angle of incidence of the airfoil blades by activating actuators to move the hub and or blades themselves.

The towing craft 601 tows the air vehicle 100 to the landing zone. The tow craft 601 tows the air vehicle 100 over the landing zone. The sensors onboard the air vehicle 100 sense various characteristics at the landing zone. The control system, e.g., controller 401, uses this data to calculate a flight path for landing the vehicle at the landing zone. In an example, the towing craft 601 can also sense characteristics and send the sensed data to the vehicle. In an example, the towing vehicle releases the vehicle 100 prior to the landing zone and the vehicle calculates a flight path based on stored data, such as flight rules and a stored target landing zone, as it approaches the target landing zone. The flight path may be stored in the memory of the control system and the controller can change the flight path based on current, sensed data. The vehicle 100 itself may circle the landing zone to have time to sense ground and flight data. In an example, the vehicle 100 includes a ground sensor, such as an imager, radar, laser guide, a camera, a radio frequency sensor, to determine the condition of the landing zone.

Figure 8:
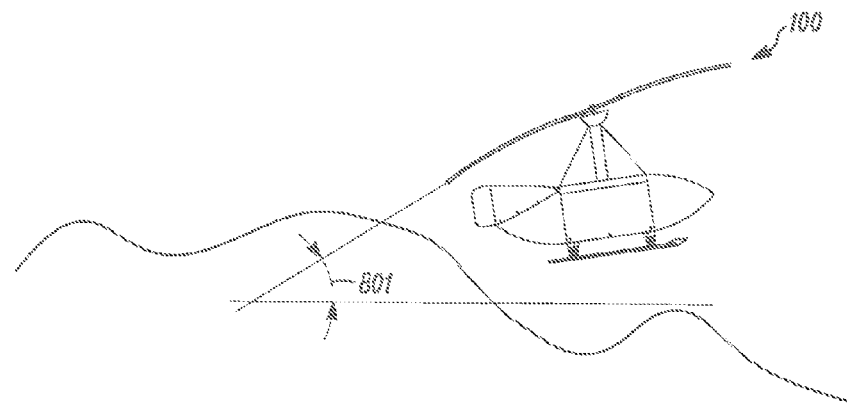
FIG. 8 is a schematic view of an air vehicle during release according to an example of the present invention.

FIG. 8 shows a schematic view of the unmanned air vehicle 100 after it is released from the tow craft 601. Vehicle 100 continues to fly but will gradually loose air speed and, hence, lift. The stabilization of flight angles (roll, yaw and pitch) and the rates of change of these can involve horizontal stabilizers, pitch of the blades, and other movable aerodynamic devices which control angular stability, i.e., flight attitude, horizontal stabilizers and ailerons can be mounted on the vehicle body. Each of these devices can be controlled by the controller. During this free flight, i.e., free from a propulsion device, such as the airplane or a helicopter, the rotor angle 801 increases. The rotor angle 801 is measured along the plane of rotation of the blades relative to the plane of the ground. Accordingly, the angle of incidence of the airfoil blades likewise increases.

Figure 9:
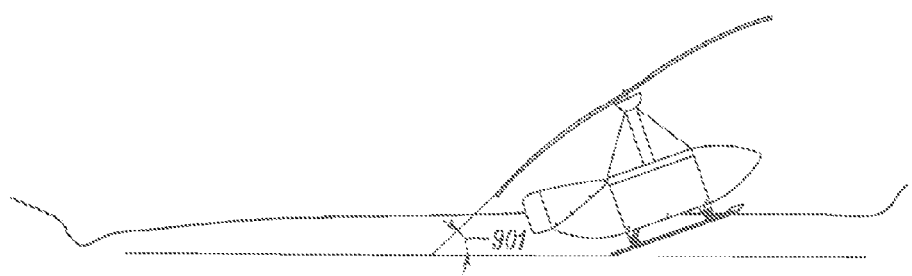
FIG. 9 is a schematic view of an air vehicle during landing according to an example of the present invention.

FIG. 9 shows a schematic view of the unmanned air vehicle 100 at landing. The air vehicle 100 flares at the landing so that is can land with a near zero forward momentum at the ground. This flaring action is controlled by the controller and results in the rotor angle 901 being further increased relative to rotor angles at the takeoff profile angle 611 (FIG. 6), the flight profile angle 701 (FIG. 7), and free flight profile angle 801 (FIG. 8). As shown the rotor angle 901 can be about 45 degrees, +/−5 degrees. In an example, the rotor angle 901 is less than about 60 degrees, +/−5 degrees. The controller can control the degree of flare at landing depending on the landing conditions. For an example, if the vehicle will land on a runway that is suitable for the landing gear on the undercarriage, e.g., wheels on a paved or unpaved prepared runway or skis on a snow or ice runway, the flare angle may be less than 45 degrees and the vehicle will roll to a gentle stop while still having forward velocity at touchdown for stability. If landing in rough, unprepared terrain, the flare may be severe to reduce the ground roll as much as possible to protect the vehicle and landing environment from damage. In an example, the air vehicle 100 can land in a landing zone of less than 500 feet in length. In an example, the landing zone is less than 300 feet in length. In an example, the landing zone is a minimum of 50 feet. In an example, the landing zone is a minimum of 100 feet. The controller can land the vehicle in a landing zone that is twice the width of the vehicle.

In a maritime embodiment, the vehicle 100 can land on deck of a water craft by employing the above methodology and essentially bleeding off all forward airspeed within a few feet of the deck. The instructions for landing the vehicle 100 can be stored in a memory on the vehicle itself or communicated to the vehicle via the tow line with integrated communication connection. In an example, landing instructions are sent to the vehicle over radio frequency communication.

Some applications may require the use of multiple vehicles to be flown together. Multiple vehicles can simultaneously deliver equipment and supplies to remote locations for example for scientific expeditions, military uses, Antarctic expeditions, geological and oceanic expeditions. The military uses can include surveillance and electronic protection operations. Vehicles 100 can be configured so that more than one vehicle can be towed by a single tug aircraft or water craft or land-based vehicle or multiple vehicles 100 can be flow by multiple tug aircraft or water craft or land-based vehicle. When in a formation the controllers 401 of multiple vehicles can communicate with each other to establish and maintain a formation. In an example, the plurality of vehicles can communicate with each other via their respective communication systems 520 (FIG. 5B). The vehicles can maintain a safe distance from each other and, if present, other aircraft. The controllers 401 can make adjustments to the flight control components, e.g., pitch control, vertical stabilizers, horizontal stabilizers, etc., to maintain the formation. When released from the tug aircraft or other towing craft, the controllers will control the flight of the plurality of vehicles to safely land all of the vehicles at the designated target. The controllers 401 can further coordinate surveillance and electronic protection operations.

Certain components for the vehicle 100 or 1000 can be removed from the vehicle after delivery of the cargo at a landing site. The controller 401 is designed as a sealed, black box that can be released from the interior of the vehicle body. The airfoil blades 135 can be released from the hub or the blade supports. The hub 132 can also be removed from the mast in an example. Any of the sensors 541-549, 551 can be removed from the vehicle. Any of the removed components can be packed in an intact vehicle 100 and flown out of the landing site. Thus, the more expensive components can be retrieved for later use on other vehicle bodies. This further reduces the cost of cargo delivery in the event that it is impractical to return to the landing zone to individually retrieve all of the air vehicles. In an example, up to five vehicles are broken down with certain components removed and placed in a sixth air vehicle. This sixth air vehicle is retrieved using a towing aircraft or is a self-propelled model that flies itself from the landing zone. The controller of the sixth air vehicle will control the vehicle during its return flight.

Figure 10A:
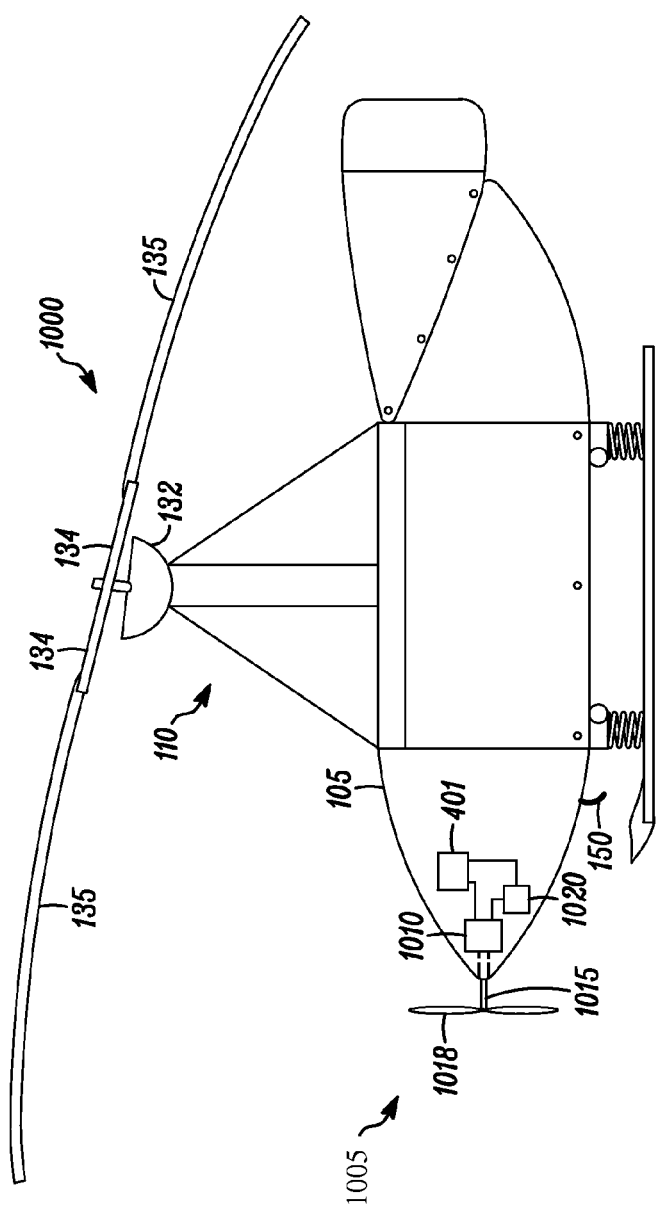
FIG. 10 is a view of an air vehicle with a propulsion system according to an example of the present invention.
Figure 10B:
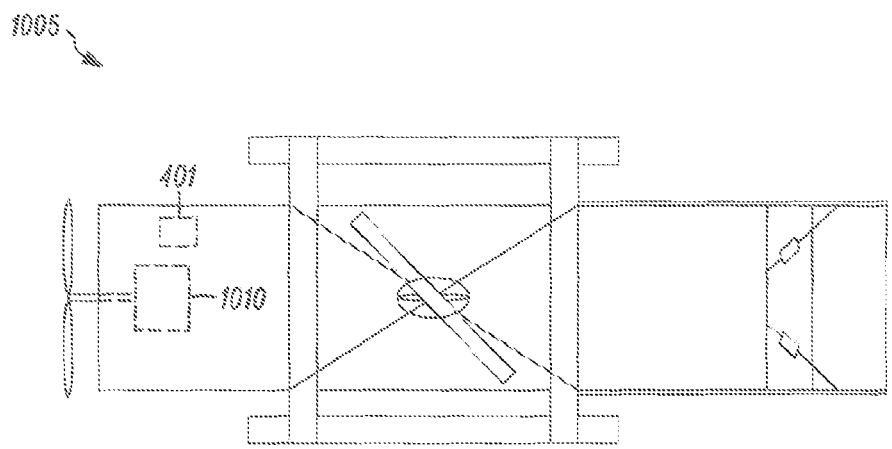
Figure 10C:
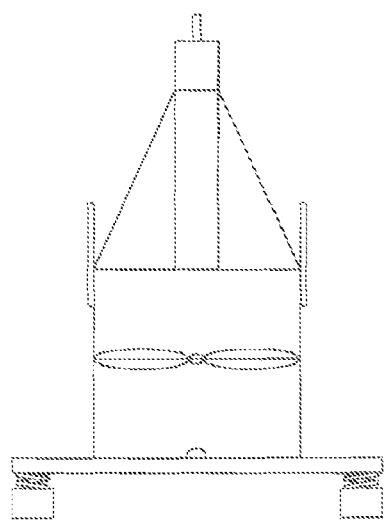

FIG. 10 shows an embodiment of the air vehicle 1000 with a propulsion system 1005. The air vehicle 1000 can include the same components as the air vehicle 100 as described herein, including the controller 401, autogyro assembly 110, etc. The propulsion system 1005 includes a motor 1010 that drives a drive shaft 1015 that extends outwardly of the body of the vehicle 100 to connect to a propeller 1018. A power source 1020 is also connected to the propulsion motor 1010 and the controller 401. The motor 1010 can be a low power, e.g., less than 100 horse power motor. In one specific example, the propulsion system 1005 is designed to be able to provide enough forward movement to the vehicle 1000 so that the autogyro assembly 110 can provide the lift to the vehicle 1000 to achieve and maintain flight. The motor 1010 and propeller 1018 are selected to provide enough forward movement so that there is sufficient air flow over the rotating blades 135 to provide lift to an empty or essentially empty vehicle. Accordingly, the propulsion system 1005 can recover the vehicle but cannot deliver any heavy cargo. The motor 1010 can be a 50 h.p. motor that runs on fuel stored in the power source 1020. The fuel can be diesel fuel in an example.

In a further application, the propulsion system 1005 is designed to be able to achieve flight with the vehicle 1000 storing the airfoil blades 135 and controllers 401 of at least two other vehicles 100. This allows some components of a fleet of vehicles 100 or 1000 to be retrieved using a vehicle 1000.

It will further be recognized that the propulsion system 1005 can be used to assist the towing aircraft in pulling the vehicle 1000. Accordingly, the vehicle 1000 can haul more cargo with less input power from the towing aircraft.

If an engine fails in the propulsed air vehicle 1000, then the forward momentum of the air vehicle 1000 will continue to rotate the rotary blades and gradually allow the air vehicle to descend to the ground as the lift deceases as the relative movement of the air against the rotary blades decreases. The air vehicle would slowly descend until landing.

Figure 11:
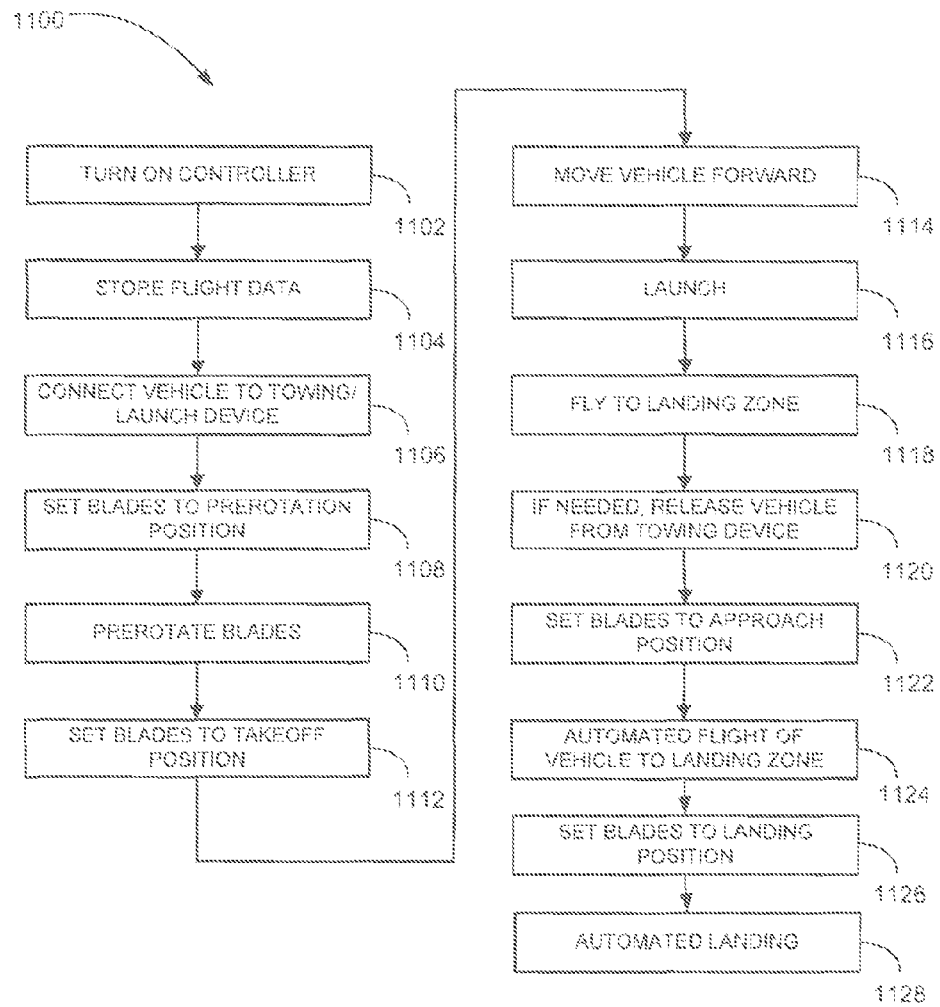
FIG. 11 is a flow chart of an air vehicle method according to an example of the present invention.

FIG. 11 shows a method 1100 of flight for an air vehicle 100, 1000 as described herein. At 1102, the controller is powered on. The controller can then perform various safety checks and check of the operational condition of the sensors on board the vehicle. The controller can further power the sensors. The controller can check the power status of the power source to determine if sufficient power is in the power source or will be available to complete a flight. The controller can also perform checks of the electronic equipment such as the memory and the communication components.

At 1104, the controller requests and stores the flight data for the current flight. The flight data can include data relating to a flight plan including, but not limited to, distance, flight altitudes, estimated time of arrival, landing zone, predicted weather, etc.

At 1106, the air vehicle is connected to a towing aircraft, watercraft of land-based-vehicle or to a launching device. The connection is at least a mechanical connection to transfer power from the towing/launching device to the vehicle. In an example, electrical connections are also made.

At 1108, the airfoil blades are set to a prerotation position. The prerotation position is a minimal angle of incidence to reduce drag on the blades when being rotated. The purpose of prerotation is to assist in the takeoff by overcoming the initial inertial forces in the autogyro assembly in general and specifically on the airfoil blades. Accordingly, the prerotation position of the blades provides minimal, if any, lift.

At 1110, the airfoil blades are rotated. This is the pretakeoff stage. Once the blades are spun up to a desired speed, e.g., revolution per minute, the pretakeoff stage ends.

At 1112, the airfoil blades are set to a takeoff position. The blades now have an angle of incidence that can provide lift to the vehicle. The controller can send a signal to actuators to control the position of the airfoil blades. The takeoff position has an angle of incidence greater than the prerotation position.

At 1114, the vehicle is moved forward by the towing vehicle or the launch device. The forward movement of the vehicle creates airflow over the airfoil blades that are set to a takeoff position. This airflow over the rotating airfoil blades creates lift that can achieve flight of the vehicle even when loaded with cargo that could not be flown by the towing vehicle alone. The controller can set the angle of incidence of the airfoil blades to a flight position after the air vehicle is airborne. The flight position of the airfoil blades has a lesser angle of incidence than the takeoff position.

At 1116, the vehicle is launched and achieves flight as there is sufficient airflow over the rotating airfoil blades to achieve flight. The controller can control the flight of the vehicle in response to stored data and rules, sensed data, and received inputs from the towing aircraft, fellow vehicles, or from ground communications. The controller can set the angle of incidence of the airfoil blades. The flight position of the airfoil blades has a lesser angle of incidence than the takeoff position.

At 1118, the vehicle is flown from the takeoff location to the landing zone. The vehicle can be towed to the landing zone by an aircraft. In another example, the vehicle is launched and flies itself to landing zone. In an example, the vehicle is towed to a location where it can complete the flight to the landing zone on its own. Due to drag and other resistive forces, e.g., friction of the rotating hub, a vehicle without a propulsion system will glide to the landing zone. A vehicle with a propulsion system can fly for a longer time and distance. If the propulsion system is adequate to provide enough forward thrust so that the drag and resistive forces are overcome, the vehicle can fly for a significant distance albeit at a slow speed.

At 1120, if needed, the vehicle is released from the towing aircraft. The release of the tow line can be in the form of a glider release mechanism controlled by either the towing aircraft, pilot of the towing aircraft, or by the controller of the air vehicle. Once released, the controller controls flight components of the air vehicle.

At 1122, the airfoil blades are set to an approach position. The controller controls the position of the airfoil blades. The approach position has a greater angle of incidence than the flight position. This will provide lift to keep the air vehicle airborne but bleed off some of the forward momentum and velocity to slow the air vehicle for approach. In an example, the takeoff position and the landing position have the essentially same angle of incidence, e.g., within one degree of each other.

At 1124, the vehicle automatically flies to the landing zone. The air vehicle is in free flight on its own. As a result, the controller sense flight data and issues control signals to controllable components, such as airfoil positions, any rotational damper in the hub or mast, and any moveable component in the tail plane. The controller uses sensed data in flight rules or algorithms to output flight control signals.

At 1126, the airfoil blades are set to a landing position. The controller can issue command signals to actuators to set the angle of incidence of the airfoil blades. The landing position of the airfoil blades has a greater angle of incidence than the flight position or the approach position.

At 1128, the vehicle has landed. The controller can no shut down some of the consumers of power to save energy in the power source. The controller can further send a status report via the communication system to a remote receiver, such as a ground station or the towing aircraft. The cargo in the vehicle can now be unloaded. In the event that the vehicle will be retrieved, the controller can indicate that the cargo has been removed by the load sensors indicating that the vehicle is now at its empty weight. In a further case, other vehicles can be broken down and stored in another vehicle for retrieval. The controller can signal that the vehicle loaded with components from other vehicles is ready for retrieval. The retrieval sequence of the vehicle is similar to the method 1100.

In the above method 1100, the airfoil blades have a plurality of positions. The prerotation position sets the airfoil blades at an angle of incidence of about zero degrees. The takeoff position has an angle of incidence of about 12 degrees. The flight position has an angle of incidence of about five degrees. The decent or approach position has an angle of incidence of about 12 degrees. The landing position has an angle of incidence of about 20 degrees. The present example positions can vary +/− one degree.

In the above method 1100, the controller can receive guidance signals from ground or air control systems. The air control systems can be from an aircraft that knows an approach envelope and the landing site. The air control system can send guidance data to the controller onboard the air vehicle. The guidance data can be on a radio frequency carrier wave. The ground control system can be at a remote location and know the approach envelope and send guidance data to the controller. In an example, the ground control system can be at or near the landing zone, e.g., within a mile or within 10s of miles or within a kilometer or with 10s of kilometers. The ground system would then know of hazards at the landing site that may not be stored in the air vehicle controller or known at a remote location. Examples of landing zone hazards are trees, utility lines, rocks, enemies, temporary hazards, etc. The ground system can alert the air vehicle to these hazards or select a new landing zone or guide the air vehicle around these hazards. The ground system can send a radio frequency signal, a microwave signal, or a light/optical signal that can be received by the air vehicle controller.

Figure 12:
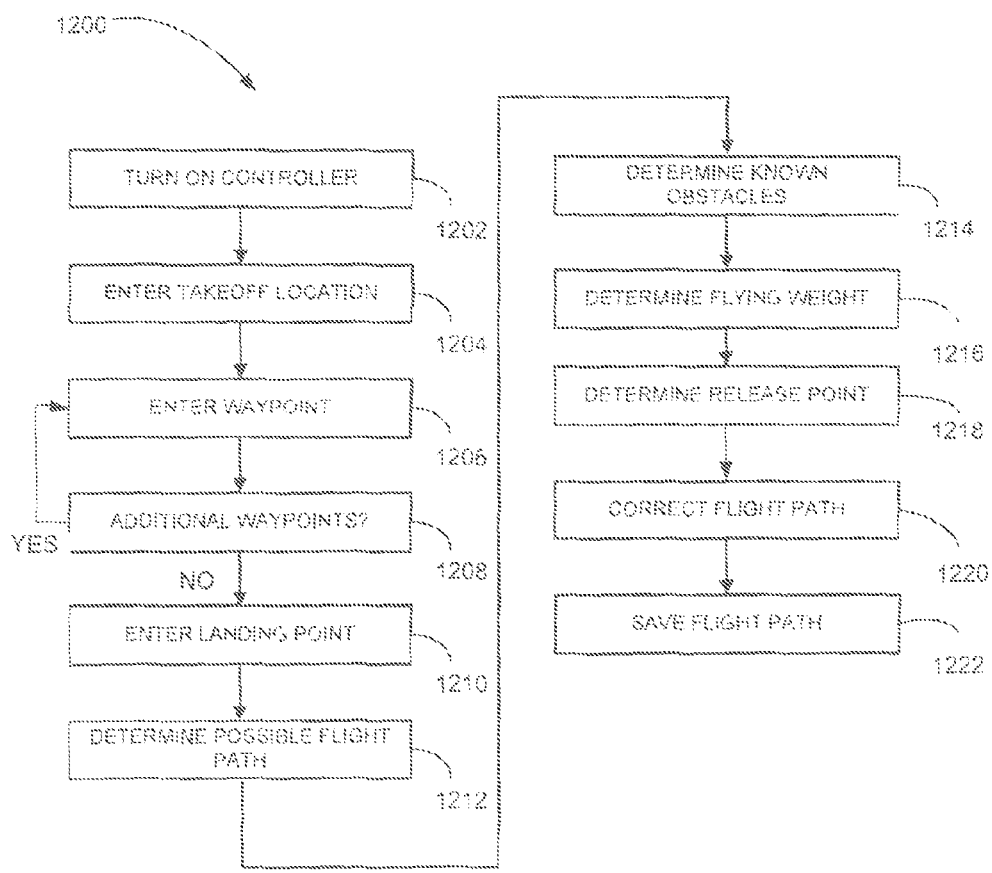
FIG. 12 is a flow chart of an air vehicle method according to an example of the present invention.

FIG. 12 shows a method 1200 of flight path calculation for an air vehicle 100, 1000. At 1202, the controller is powered on. At 1204, the takeoff location is entered. The controller can use on board sensors to determine its current location and use that location as the takeoff location. The controller 401 can select from a database containing all nearby airfields. In an example, the takeoff location is downloaded to the controller.

At 1206, a waypoint is entered into the controller. The way point is a spatial location along the intended flight path of the air vehicle. The spatial location is a three dimension position of the air vehicle including altitude, longitude and latitude. At 1208, a determination is made whether additional waypoints are to be entered. If yes, the flow returns to step 1206. If no, the method enters a landing point at 1210. The landing point includes the spatial location of the landing zone. At 1212, a possible flight path is computed. At 1214, a database is accessed to determine know obstacles using the possible flight path. At 1216, the flying weight is determined. At 1218, the release point from the towing device (e.g., aircraft) is determined. This is based on the flight characteristics of the air vehicle and the landing zone location and environment. As 1220, the final flight path is determined. At 1222, the final flight path is stored by the controller in memory accessible to the controller during flight.

Figure 13:
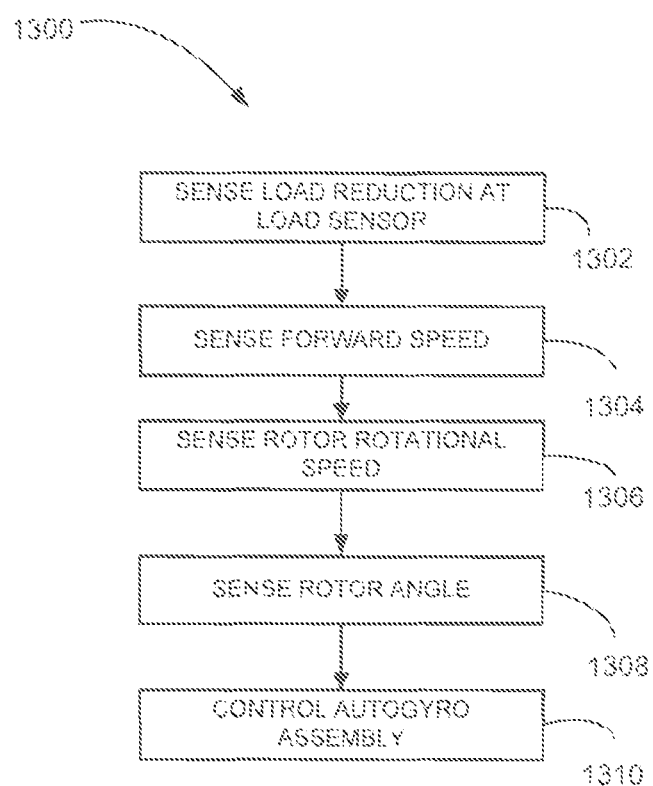
FIG. 13 is a flow chart of an air vehicle method according to an example of the present invention.

FIG. 13 shows a takeoff flight control method 1300. At 1302, the load sensor senses when the load is lessened and essentially removed from the landing gear. At 1304, the forward speed of the air vehicle 100, 1000 is sensed. At 1306, the rotational speed of the rotor is sensed. This can be done at the hub or based on rotation of the drive shaft. At 1308, the angular position of the rotor blades is sensed. The angular position of the rotor blades is measured based on the plane that the blades rotate in versus the horizontal plane of the ground or relative to the air flow that flows against the blades. The angular position has an effect on lift and drag of the air vehicle. Each of the sensing operations described with respect to FIG. 13 communicates the sensed data to the controller. At 1310, the controller can use the sensed data to control the operation of the autogyro assembly including but not limited to the rotor rotational speed, the rotor angle, an assist by the prerotor motor, if available, use of the propulsion system, and release of the tow line. The controller can trade altitude for forward speed to create more lift. The controller can increase the rotor angle to create more lift as long the vehicle stays above a stall speed. The controller can actuate breaks to slow the rotation of the blades to decrease lift.

Figure 14:
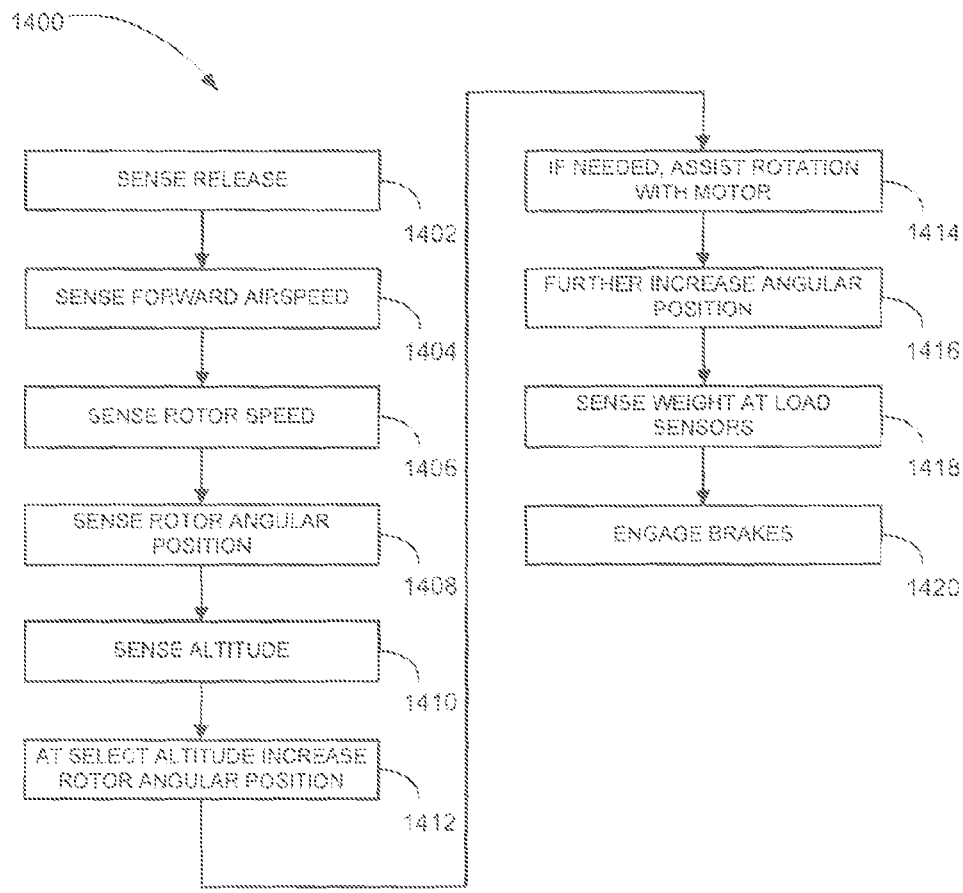
FIG. 14 is a flow chart of an air vehicle method according to an example of the present invention.
Figure 15:
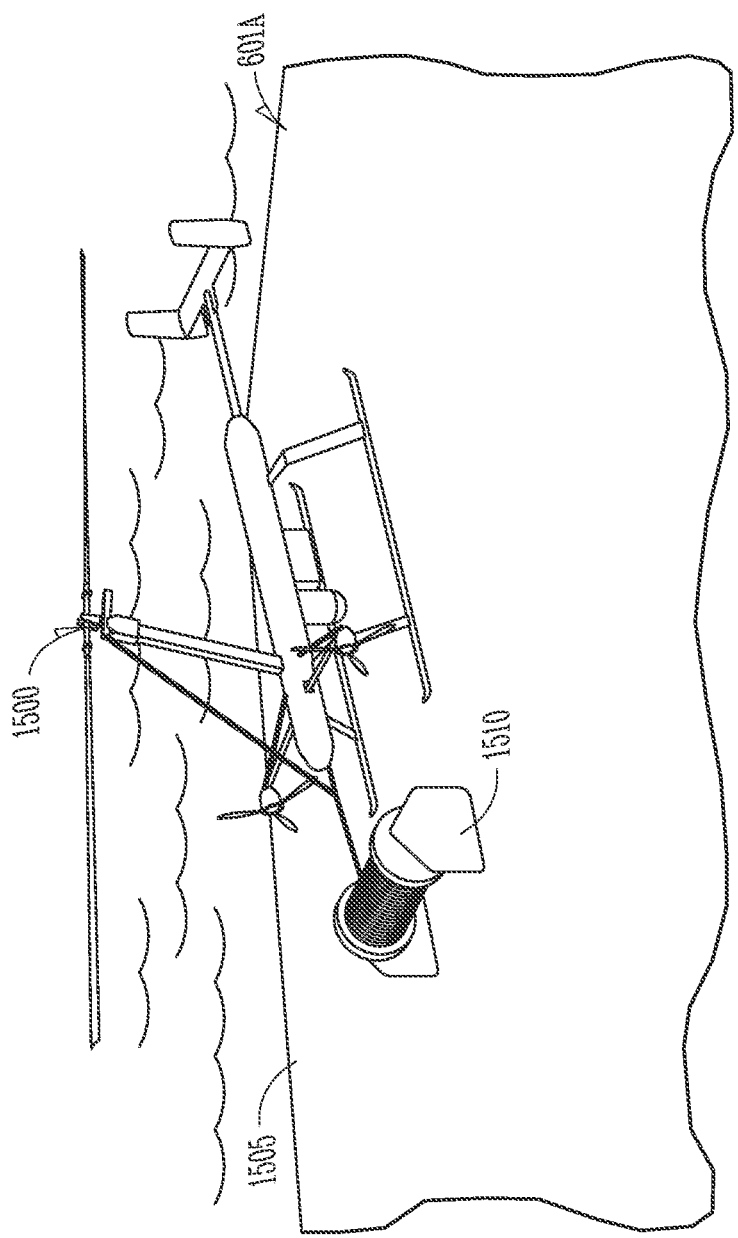
FIG. 15 is a schematic view of a maritime use of the air vehicle according to an example of the present invention.

FIG. 14 shows a landing method 1400. At 1402, the release of the air vehicle 100 or 1000 from the towing vehicle is sensed. At 1404, the forward airspeed of the air vehicle is sensed. At 1406, the rotor rotational speed is sensed. At 1408, the rotor angular position is sensed. At 1410, the altitude is sensed. This can be sensed by ground radar or by three dimensional navigational system signals. At 1412, the rotor angular position is increased at a first altitude. At 1414, the controller can activate the motor to assist the blades in their rotation. At 1416, the rotor angular position is further increases at a height close to the ground. At 1418, the load is sensed. At 1420, the brakes are engaged. The brakes can be rotor brakes to stop the rotation. The brakes can also be landing gear brakes to stop rotation of the landing gear wheels or brake the landing gear skids.

In an example, the air vehicle can be released at an altitude of greater than 10,000 feet and then automatically using the onboard controller (i.e., unmanned) control its descent to a landing zone. Accordingly, the tow aircraft can remain miles from the landing zone to ensure its safety if the landing zone is in a military area, particularly where and when an enemy may be present or consider the target to be of high value. The air vehicle, in an embodiment, does not have a running motor during it approach or landing. Accordingly, the air vehicle is quiet as it is free from motor (e.g., internal combustion or turbine) noise.

While the above examples show the air vehicle 100 vehicle being towed by a plane, it will be understood that the vehicle can also be towed by other propulsion vehicles e.g., a helicopter. Another example of a propulsion vehicle is a winch that acts on a tow line to move the air vehicle 100 forward. The tow line can be automatically released once the air vehicle 100 has sufficient forward speed to create lift. The controller can control the release of the tow line. The winch example would be useful with the propulsion embodiment as the propulsion system can keep the air vehicle aloft for an extended period relative to the non-propulsed air vehicle.

The air vehicle as described herein includes an autogyro assembly that provides for stable low velocity flight. As the rotating airfoil blades provide lift and stability, the air vehicle does not require roll controls.

The air vehicle 100 or 1000 can be used in delivery, military, emergency, and agriculture uses. Agriculture uses can include aerial seeding or aerial spraying. Seed release mechanisms or sprayers can be mounted to the containers 105. The on-board controller can control operation of the seed release mechanisms or sprayers. The agricultural uses can further delivery feed to animals. A drop mechanism can be mounted to the containers 105. The drop mechanism can drop an entire load or can drop single units, such as single bales of hay. The on-board controller can control operation of the seed release mechanisms, sprayers, or the drop mechanism.

The present air vehicle is to be compatible with unmanned aircraft system ("UAS") of the U.S. Department of Defense or the Federal Aviation Authority. The military role of unmanned aircraft systems is growing at unprecedented rates. Unmanned aircraft have flow numerous flight hours as either drones controlled from a remote location or as autonomous aircraft. The present air vehicle can be part of a UAS that performs intelligence gathering, surveillance, reconnaissance missions, electronic attack, strike missions, suppression and/or destruction of enemy air defense, network node or communications relay, combat search and rescue, and derivations of these themes.

The air vehicle as described herein operated on the principal of the autogyro and takes advantage of two features of thereof, namely, a reduced takeoff and landing area relative to a powered airplanes and, second, its low speed and high speed flight characteristics. In an example, the air vehicle as described herein can take off in little as zero fee of runway and in other examples, in less than 50 feet of runway. In an example, the air vehicle as described herein can land in under twenty feet. Another feature of the air vehicle is its ability to fly slow and not stall. When the air vehicle stops its forward motion it slowly settles to the ground as the rotary wing will continue to rotate and create some lift as the air vehicle settles. In an example, the air vehicle can fly at speeds as low as 15 mph. This is based on the air vehicle developing lift with its spinning rotor hub blades. As a result the air vehicle has a larger speed envelope. Moreover, the vehicle is capable of flying in a greater range of speeds than airplanes.

The air vehicle has the advantage of flying at a low speed without a stall. The result of slowing of the air vehicle down too much is just that the aircraft will descend gently. Accordingly, the present air vehicle has a major advantage over airplanes and helicopters—safety in event of an engine failure.

The air vehicle can be used in remote areas, like those in Alaska, Canada, Philippines, and South America. The air vehicle can be used to provide supplies, and even fishing boats, to lodges and to remote locations. Oil and gas exploration and pipeline operations can be supported by air vehicle delivery. Other applications include mail and parcel delivery, disaster relief, and emergency medical and survival supply delivery. The container of the air vehicle can be modified to hold liquids from fire prevention and can act as a water bombing device.

The air vehicle further provides some of the hazards of military cargo transport by avoiding ground delivery. Moreover, the air vehicle increases the capacity of each flight resulting in fewer flights required to deliver the same amount of cargo. Moreover, the air vehicle can deliver cargo where needed with landing the towing vehicle. This is safer for the pilot and ground transport team. The pilot need not land in a hazardous area. The ground transport team need not take the same roads from the airport to the locations where the equipment is staged or required. The air vehicle can further be delivered in the event of brownouts by the use of helicopters, which do not require the electricity-based assistance that many planes require. The air vehicles can be used to stage a forward aerial refueling point. In an example, one air vehicle can include pumping equipment and any number of tanker vehicles can be landed near the pumping vehicle to provide the refueling point.

It will further be noted that the air vehicle is adaptable to any flying craft. As a result, aircraft that are not typically thought of as cargo craft can be used as cargo craft. In an example, a Scout-Attack Helicopter can deliver cargo by towing an air vehicle as described herein. Moreover, the helicopter can tow its own support equipment as it deploys.

The air vehicle further provides environmental, i.e., "green", benefits of reduced fuel consumption and the exhaust products by reducing either the size of the aircraft used to carry a same load or the reduction in the number of trips required to transport a same amount of cargo. In some examples, the air vehicle can reduce fuel use by above 50% for the same amount of cargo. In certain applications of the air vehicle 1500, fuel use can be reduced in a range of 70% to 90%. One measure of fuel use is the tonnage of cargo delivered per certain amount of fuel. In some applications of the air vehicle 1500, the number of trips required by an aircraft is reduced by 75%.

The air vehicle 100 or 1000 as described herein can be adapted to surveillance and/or electronic protection operations. FIGS. 15-18 show a maritime operation using the air vehicle 1500, as described herein. The air vehicle 1500 is on a deck 1505 of a launch apparatus 601A, here shown as a ship. It is within the scope of the present disclosure to launch the air vehicle 1500 from the back of a land vehicle, e.g., a truck, automobile, jeep, or other military vehicle. A winch 1510 is fixed to the towing vehicle, e.g., a ship, on which is coiled a line that connects the air vehicle 1500 to the launch apparatus 601A (e.g., ship). In an example, the air vehicle can have a mass of about 25 lbs. (and in some examples greater) to provide adequate electronic surveillance. In some examples, the air vehicle 100 can be in the range of about 25-700 kg. The unmanned air vehicle 1500 (or 100, 1000 described above) can have less than 150 lb gross vehicle weight, e.g., about 100-150 lbs. GWT Unmanned Cargo Autogyro Glider (UCAG), while supporting 75 lbs. or less e.g., a 50 lbs. or less, sensor payload with a less than 15 foot blade, e.g., less than 10 foot rotor or in a range of about 8-10 foot rotor. This reduces mass and size can further reduce the radar image of the vehicle 100 and the ability to optically detect the vehicle 100 by a person or through electro-optical means. The frame and container, which holds the controller and other electronics as well as sensors, is configured with a minimal of flat surfaces to reduce its radar signature. In an example, the autogyro assembly is unpowered and relies on the forward movement of the ship 601A to rotate the blades of the autogyro assembly and create lift. In a further example, the autogyro assembly can be powered.

The air vehicle 1500 is launched by releasing the blades for auto-rotation, which can occur due to a headwind or forward movement of the ship. The controller (e.g., any controller described herein) can control the pitch and angle of attack or any other launch setting. In an example, the air vehicle 1500 only needs to experience a wind speed of about 10-20 knots to provide adequate rotation of the autogyro blades to lift the air vehicle 1500 off the ground or deck of the launch apparatus. When the air vehicle 100 has sufficient lift, the winch 1510 can play out the line so that the vehicle 100 can lift off the deck 1505. The controller can communicate with a winch controller through the line, which can include a data communication wire(s) integral with the line (e.g., 1511 in FIG. 16). The controller on board the air vehicle 1500 can automate the operation of the winch as the controller is applying flight algorithms to ensure its safe flight.

In a further example, the autogyro assembly is powered to conduct flight operations using the air vehicle 1500.

Figure 16:
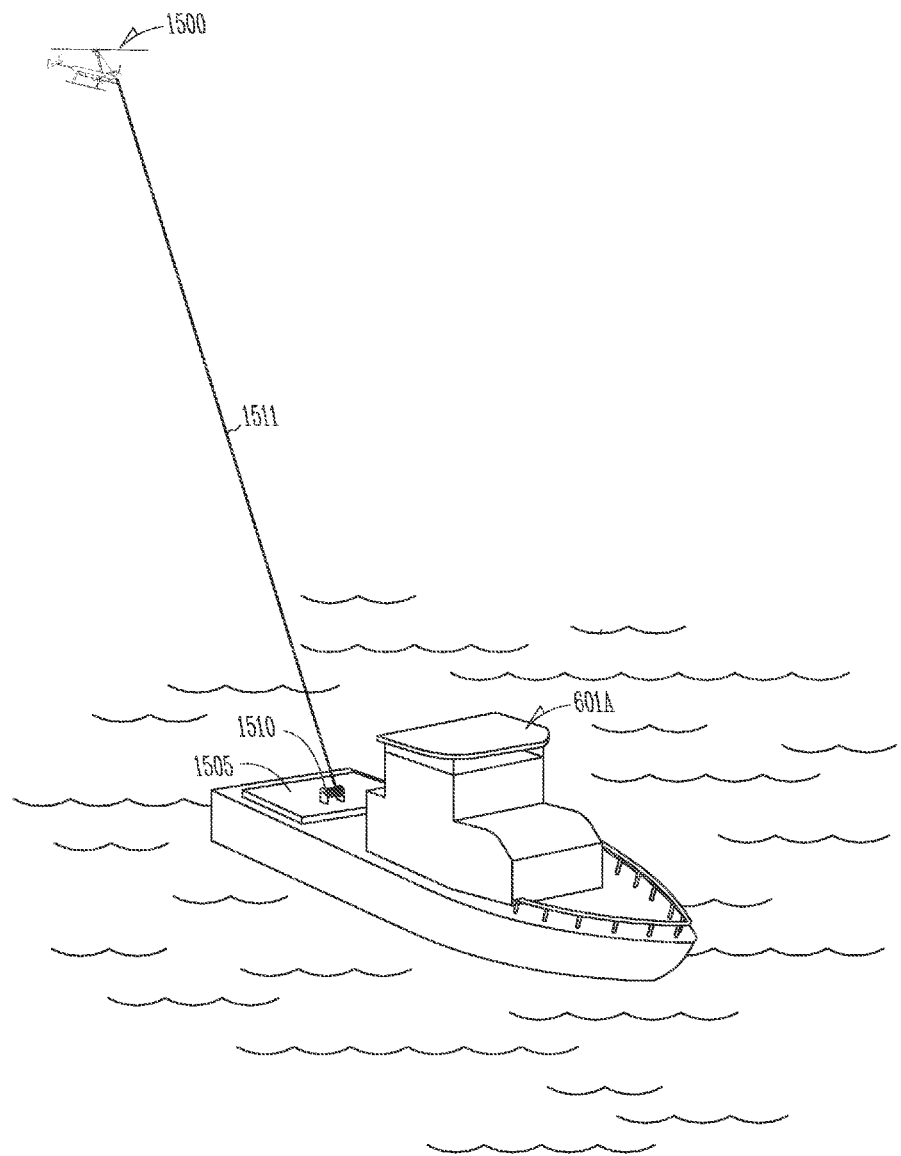
FIG. 16 is a schematic view of a maritime use of the air vehicle according to an example of the present invention.

FIG. 16 shows the unmanned, autogyro, air vehicle 1500 in its flight position, rearward and above the towing craft 601A and above the water level. The air vehicle 1500 can position its sensors at a significantly higher point than the towing vehicle 601A can position its sensors. In an example, the air vehicle 1500 is hundreds (100s) of feet above the towing vehicle 601A. In an example, the air vehicle 1500 at least one thousand (1000) of feet above the towing vehicle 601A. The sensors onboard the air vehicle can increase in detection range about 3-5 times that of the towing craft 601A, e.g., a greater than 3 times increase relative to the horizon detection range. The air vehicle 1500 can include optical sensors, passive electronic warfare (EW) monitoring, communication relay, active EW, e.g., radar platform. When the air vehicle 1500 is flying and operating in an active electronic mode, it produces its electronic signature remote from towing vehicle 601A, which adds to the safety of the towing vehicle 601A.

The air vehicle 1500 is under control of its controller and does not require fuel for a propulsion system, it can be made small and have a small image, radar and/or optical. The air vehicle 1500 can stay aloft indefinitely, for example, days or weeks. The air vehicle 1500 is essentially all weather and can fly in the rain, snow, sleet or other adverse weather conditions. Moreover, the air vehicle can sense impending adverse weather at a greater distance and with greater accuracy than the tow vehicle 601A. Indefinite flight can mean that as long as an unpowered air vehicle has air motion over it rotor, it can stay aloft. The air motion can be a headwind or forward movement of the air vehicle, e.g., from the towing vehicle (ship, water craft, or land vehicle).

Figure 17:
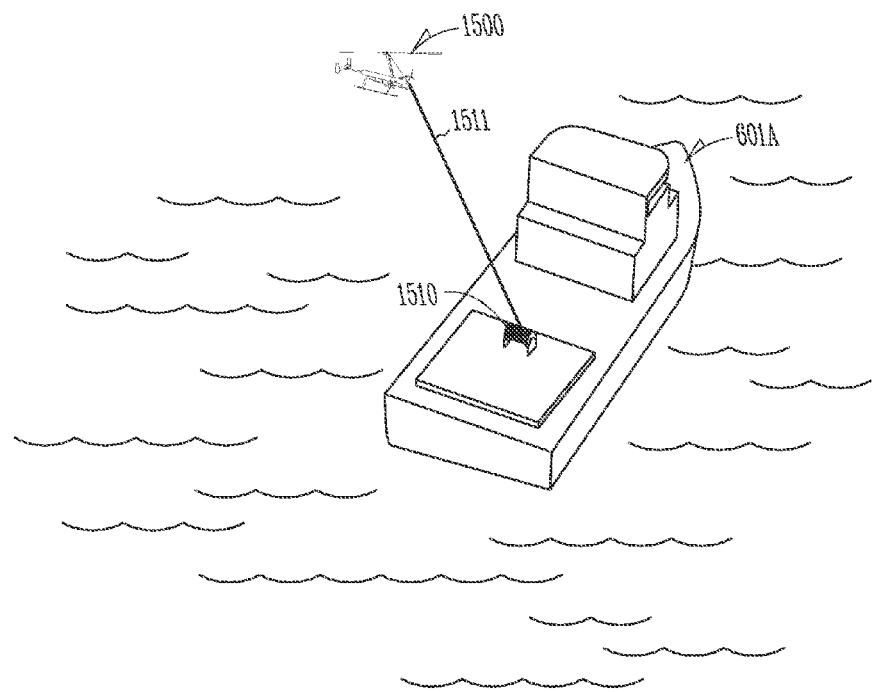
FIG. 17 is a schematic view of a maritime use of the air vehicle according to an example of the present invention.

FIG. 17 shows a similar view as FIG. 16 but from a rear vantage point. Specifically, the air vehicle 1500 is trailing behind the towing vehicle 601A. The vehicle 601A can be stationary and facing into the wind, which can provide the motive force to keep the autogyro, air vehicle aloft. In another example, the vehicle 601A is moving forward on the surface of the water. While the towing vehicle is shown as being on the surface of the water, it will be within the scope of the present disclosure to tow or tether the air vehicle 1500 using a vehicle on land or submerged beneath the surface of the water.

Figure 18:
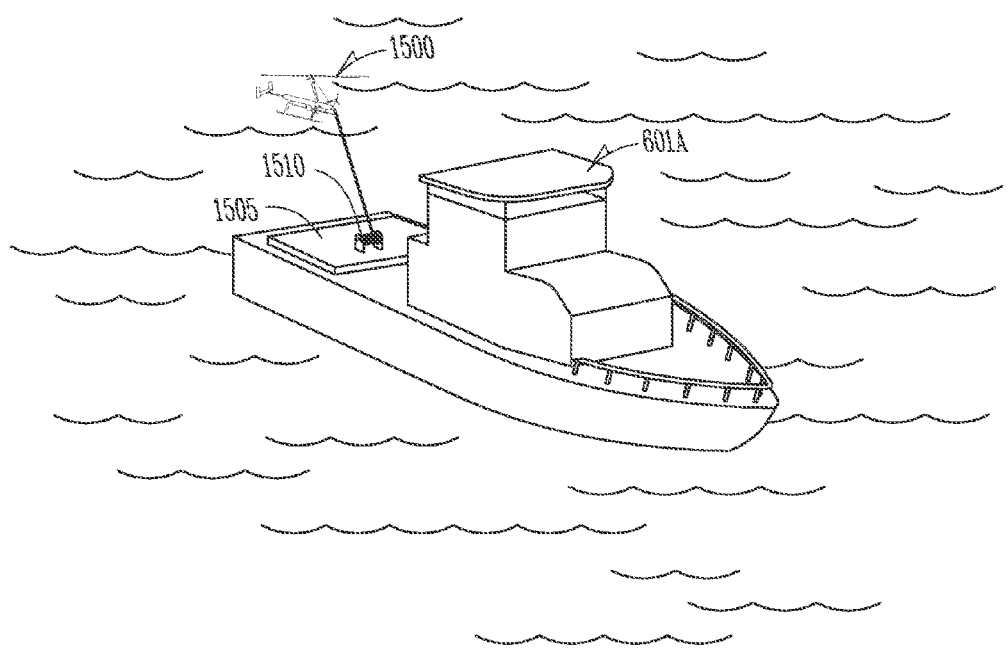
FIG. 18 is a schematic view of a maritime use of the air vehicle according to an example of the present invention.

FIG. 18 shows the air vehicle 1500 at a position closer to the towing vehicle 601A, which can be in a launch operation or a landing operation. In either operation, the controller can control the winch operation based on its sensed data relating to the actual flight data of the air vehicle 1500. In another example, the winch can be operated manually by personally onboard the towing vehicle 601A and the air vehicle 1500 can react to the change in the line caused by the winch. That is, the air vehicle 1500 preserves itself while being played out from the vehicle 601A or reeled in to the vehicle 601A.

Secure data transmissions can occur between the air vehicle 1500 and the towing vehicle 601A over the line 1511 as the line can include a shielded wire that provides bi-directional communication with minimal stray electromagnetic radiation. Encrypted wireless communication can also be used between the towing vehicle 601A (or other communication devices) and the air vehicle 1500.

The air vehicle 1500 can hover for a period of time with receiving forward propulsion from the towing vehicle 601A. In an example, the controller on board the air vehicle can sense or is signaled that the towing vehicle is stopping or stopped. The controller can apply stored flight rules to remain aloft for a period of time. In one example, the controller turns the air vehicle 1500 to face into the wind, if any. The wind blowing past the rotor blades will power the blades to provide lift. In the case where the wind is strong enough the air vehicle 1500 can stay aloft indefinitely. However, if sufficient wind is not present, the air vehicle 1500 can trade altitude for forward movement to provide lift.

The electronics on board the air vehicle 1500 can provide a full spherical coverage sensor coverage that envelopes the towing craft 601A. In a further example, the electronics onboard the air vehicle 1500 provides sensor coverage for a partial spherical (e.g., a spherical cap) above the surface of the water or earth. It will be understood that the bottom of such a partial sphere may be curved to follow the radius of the earth. The air vehicle 1500 can also provide a long detection range with a fast communication time to the towing craft 601A. Electronics can be provided onboard the air vehicle 1500 to filter false reads (e.g., alarms) and provide protection of the air vehicle against hostile electronic attacks. In some specific examples, the air vehicle 1500 can track a missile's trajectory and infrared signature. In summary, the air vehicle 1500 can apply sophisticated algorithms related to both image processing and signal processing. The air vehicle 1500 can operate as a standalone system or can be integrated as part of an electronic protection suite with other sensing devices, e.g., other air vehicles 1500, aircraft, satellites, land-based sensors and others.

In a further embodiment, the air vehicle 1500 can include false imaging algorithms that enlarge its electronic signature as a protection to the towing craft 601A. In an example, the towing craft 601A is under threat, e.g., from a missile or aircraft, the air vehicle 1500 can be released and its electronics can increase it electronic signature and change its flight pattern to mimic a target. In a further protection mode, the air vehicle can include launchable flares or chaff that change the heat and radar image of the air vehicle 1500 away from the towing vehicle 601A.

The above embodiments describe a small air vehicle 1500. In other examples, the air vehicle 1500 is scalable to a smaller size, which would require less lift to remain aloft, which may be useful over land borders. The air vehicle 1500 is also scalable to carry a payload of a thousand pounds or more and, hence, can carry some of the most sophisticated electronic protection systems.

In a specific example with the air vehicle 1500 being used in a maritime operation, the air vehicle 1500 can be folded to a 4×2×2 ft case and positioned aft in a patrol craft sized between 20 and 40 ft. The air vehicle 1500 can be mounted atop a small 6-8 ft towing frame where the sensors are operated either perched from the towing frame for slow (e.g., harbor) operations or in flight underway on open water. The air vehicle 1500 can include a small electric motor that spins the rotor to flight RPM and then disengages as the operator releases the air vehicle 1500. The air vehicle 1500 can fly as a kite and climb to about 250-300 ft height on a 500-600 ft line. The air vehicle 1500 will orient into the prevailing wind direction enabling the search path of the towing patrol craft to take any desired. Power is supplied to the sensor via the towing line, which incorporates a power, data and load bearing lines. Recovery can be made into the wind by winching the air vehicle 1500 back to remount on the towing frame. Under normal operations the air vehicle 1500 does not touch the water. Once launched into the wind the air vehicle 1500 can fly in front of the patrol craft or at any angle of prevailing wind. Failure modes for the air vehicle 1500 can include an inflatable raft-like landing gear for emergency water landings, on board batteries for temporary power supply and water immersion proof payload containers.

The air vehicle 1500 can also be modified to include a small propulsion system that would extend its untethered flight range such that it could be launched and untethered to investigate remote targets of interest. The air vehicle could then return to the tow vehicle (e.g., a watercraft) or launch site using its onboard flight controller.

The air vehicle 1500 for certain electronic protection operations will require an antenna. In an example, the antenna described in US Patent Publication No. US 2007/0146202 (which is incorporated by reference for any purpose) can be used and connected to the controller 401. The air vehicle 1500, 100 or 1000, including controller 401, can further include electronics such as U.S. Pat. No. 7,259,713; U.S. Pat. No. 7,125,175; U.S. Pat. No. 7,161,131; U.S. Pat. No. 7,604,197; U.S. Pat. 7,176,831; and US Pat App. Pub. Nos. 2009/0174596 and US 2008/0316125, all of which are incorporated by reference for any purpose. If any of the documents incorporated by reference conflict with the present disclosure, the present disclosure controls.

Figure 19:
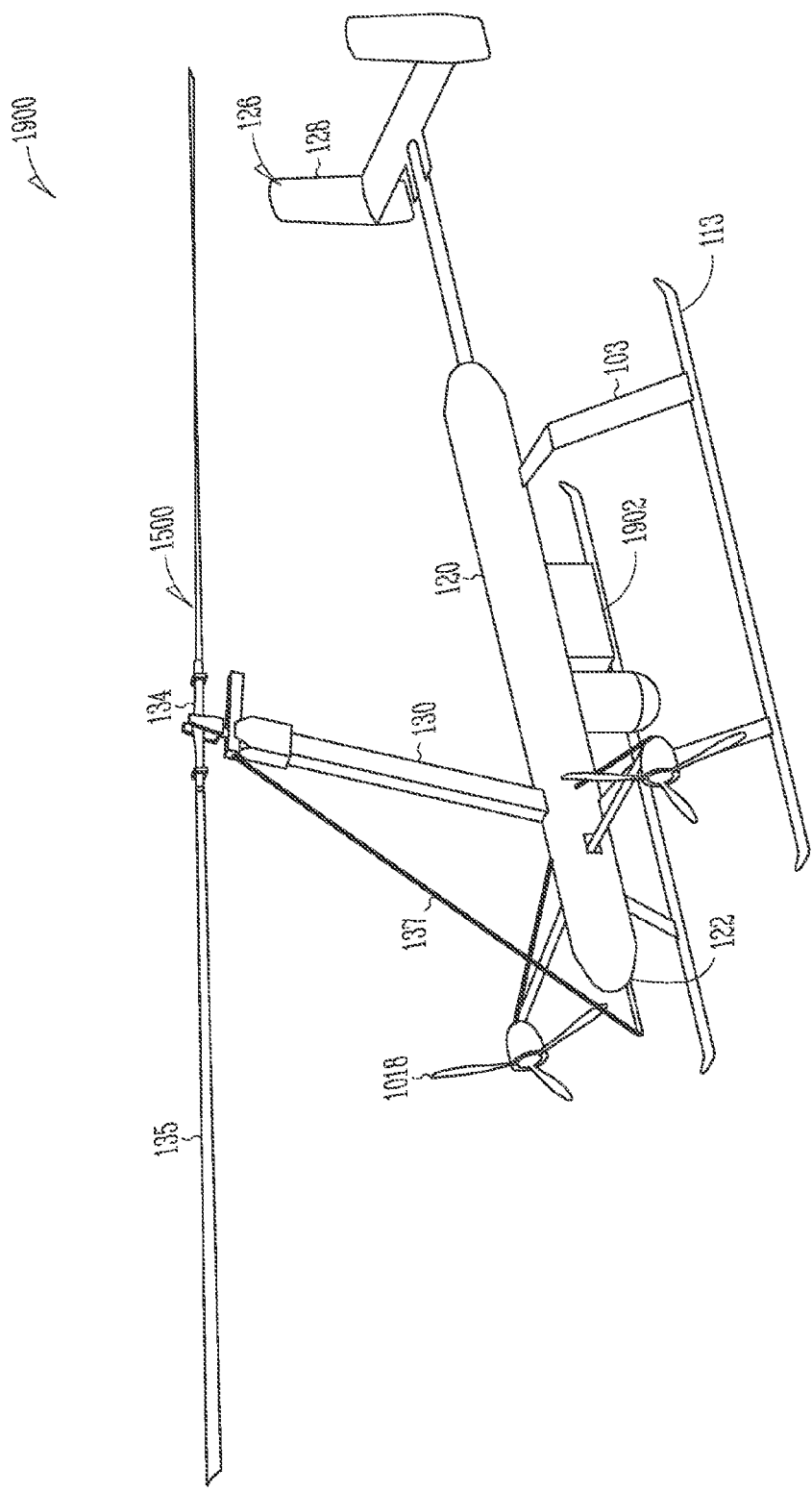
FIG. 19 is a perspective view of an air vehicle according to an example of the present invention.

Referring to FIG. 19, a view 1900 of an air vehicle is shown, according to an embodiment. The components of the system have been generally described above, with FIG. 19 displaying the unique body 120 having a shape and small, portable size option. The air vehicle 1500 can be used as a component of a long endurance all weather force protection system. The autonomous and self recoverable tethered autogyro (e.g., a vehicle 1500) provides a stable sensor platform for fixed and mobile persistent surveillance operations. The system has a compact footprint, wind generation self power system and is easily operated and deployed by non-specialist personnel, such as soldiers or seamen. A compact footprint can be on the order of feet or less than ten feet. Other embodiments can have a size of less than two feet. Air vehicle 1500 is designed to support small austere, high altitude forward operating bases, which can have high winds or other extreme weather conditions where other unmanned autonomous vehicles (UAVs that operate like airplanes) and aerostats are impractical. In a similar manner, mobile operations, such as convoys and tactical operations, can have a need for a dedicated, compact and easily operated persistent surveillance system mounted on a vehicle. The air vehicle 1500, unlike UAVs, can provide a constant over-the-horizon 360-degree surveillance capability optimized for asymmetric operations. Additionally, a smaller compact version can be used for dismounted (e.g., ground) troops.

In operation, the vehicle 1500 and its ground support equipment can be stowed within a purpose built ground transportation vehicle or trailer, or in the case of smaller units, packed in a suitable transportation case, which can be carried by a single person. The body 120 of the vehicle can be weather sealed and the entire vehicle 1500 designed for rapid assembly, disassembly and easy access for maintenance, in various embodiments. An all electric propulsion system allows the vehicle to be folded into itself for transport and storage. The rotor blades can be packed in one case while the complete airframe, base station, and launch and recovery system fits into a second transport case. The system case can include the base station, winch, tether and tools.

At the time of deployment, the equipment is moved to the surveillance location and a suitable area for conduct of operations identified. The constraints associated with launch and recovery operations, and to accommodate shifts in direction of winds can be determined.

The vehicle 1500 is quickly unfolded/assembled and the tether attached. The operator station is powered and initialized, followed by electrical power being applied to the flight vehicle avionics (e.g., controller and sensors) and payload. Upon completion of a built in test, establishing a valid navigation system solution in the controller, a preflight inspection of the vehicle and payload is performed along with any other required preflight checks. The battery packs for rotor power during climb are enabled, the ground-based winch mechanism for the tether is set, and the operator commands automatic rotor spin-up and launch of the vehicle with the tether slack. A vehicle ground constraint can be useful in some launch scenarios, and will be released upon command after achieving full rotor RPM. Vertical climb is initiated as the tether is unreeled. A twin engine tractor design can provide the necessary counter torque during power rotor operations, as well as precise control over the vehicle trajectory during launch and recovery. Once clear of ground based obstacles, some forward velocity can be employed for the efficiency of the climb operation. Once at altitude (1000 feet or more, for example), the autorotation state is established for the given wind conditions with the tether taught, power to the rotor and thrusters is removed and indefinite surveillance operations begin. Rotor collective pitch is automatically adjusted to optimize the rotor RPM to maintain consistent altitude. Power can be applied to the rotor for a period if the winds drop below the wind speed required to maintain a select altitude. The balance between system weight (principally, battery capacity), onboard battery charging capability using energy extracted from the rotor, and tolerance for low winds can be determined. An onboard battery pack can provide power to the electric motors during the takeoff and landing sequence, or power the sensor pack if ground power is lost or power the engines to return the vehicle to base in the event of an extended ground power failure. The tether can provide an electrical connection, e.g., power for the sensor pack and recharge the battery pack during the sustained auto rotation.

When the vehicle 1500 reaches altitude the vehicle weathervanes into the wind and stabilizes, the motor to the rotor system de-energizes and the vehicle enters auto rotation. The main rotors are designed with a full length power band, (blade twist) this allows the vehicle to transition into a fully sustainable autorotation (autogyro flight). The tractor motors help maintain position as needed (powering the optional propellers). The main motor can provide about 15% to about 20% power to the main rotor to maintain position during sporadic or mild winds, (winds less than 15 mph).

While in autogyro flight, the vehicle 1500 is nearly silent. The small body and main rotor disk are nearly invisible from the ground. Composite construction for the body 120, and other components, also minimizes the radar signature. A data tether handles all communication between the vehicle and the base station minimizing the EMI signature.

The sensor package can be powered from the ground through a power and data tether. A ground power generator, vehicle power, or base supplied power is converted into high-voltage low amperage and sent through the tether to a power converter on the vehicle. The converter powers the onboard systems, sensor pack and recharges the batteries. The batteries provide backup power in the event of a failure of the ground power system. Data is securely transmitted through the tether to reduce/eliminate the EMI signature. In the event of a tether data failure the vehicle has a backup RF data transfer system. Operating as an autogyro and kiting on the prevailing winds the vehicle 1500 can maintain position for an indefinite length of time.

During the recovery operation the vehicle system engines repower the main rotor and tractor engines. This puts a constant tension on the tether as the winch reels in the vehicle 1500. The operator can reposition the vehicle to clear obstructions. Recovery of the vehicle is similar to the operation described for ascent. A positive tension may be applied to the tether by the vehicle as the vehicle is reeled in.

A winch designed to support a tethered balloon-borne sensors system can be adapted for use with the vehicle 1500 and towing vehicle 601A described herein. The operator has full control of the variable speed motor with precise control over the altitude and tension of the tether. A portable electronic cable winch can be optimized for the precise control of vertically-lifted payload. As the system operates, the motor speed is controlled by the user. Cable playout rates under various wind conditions are set and stared in a controller for the vehicle or the control system to control the operation of the winch or displayed to the operator, who in turn can operate the winch and control the playout rate. The winch can have an interface for both power and data transfer.

The winch system includes a sturdy reel to support the cable or line and an internal variable speed DC gear motor drive coupled to the reel. Line playout (e.g., unreeling) can be controlled by an anti-tangle mechanism similar to those used on large fishing reels. A durable waterproof high impact plastic case protects the system and permits rapid setup. Reel speed and direction are governed the operator and the base station control unit.

Figure 20:
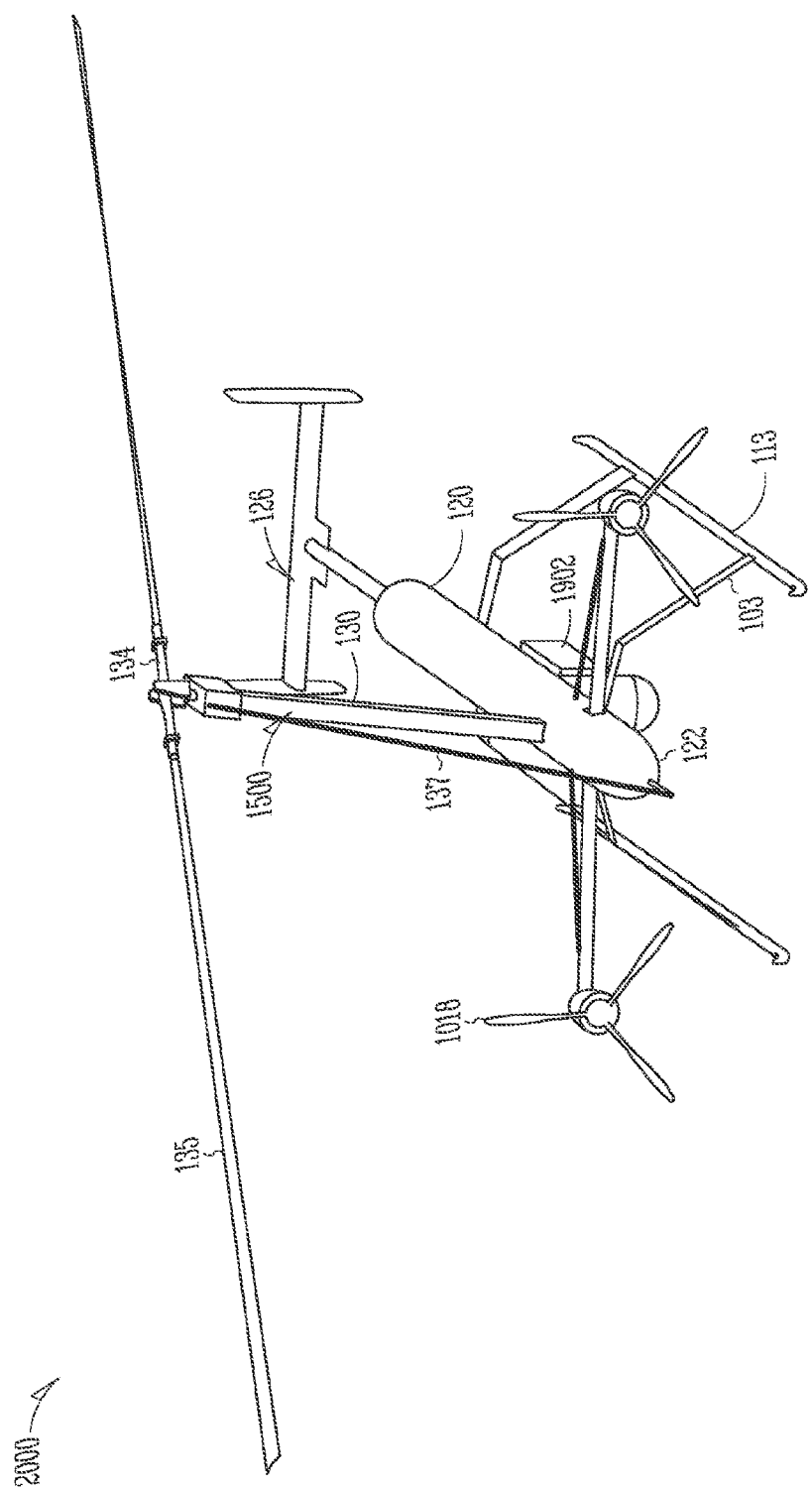
FIG. 20 is a perspective view of an air vehicle according to an example of the present invention.

During continuous, persistent operation at altitude, power can be provided to the vehicle 1500 in multiple ways. One or more of ground power, airborne battery power, and power generation from the rotor can be utilized to minimize system size and weight and maximize performance and system reliability, and to provide good fault tolerance. A control and sensor package 1902 (including surveillance) can be mounted external from the body 120 or as part of the body 120. A frontal perspective view 2000 is shown in FIG. 20.

Figure 21:
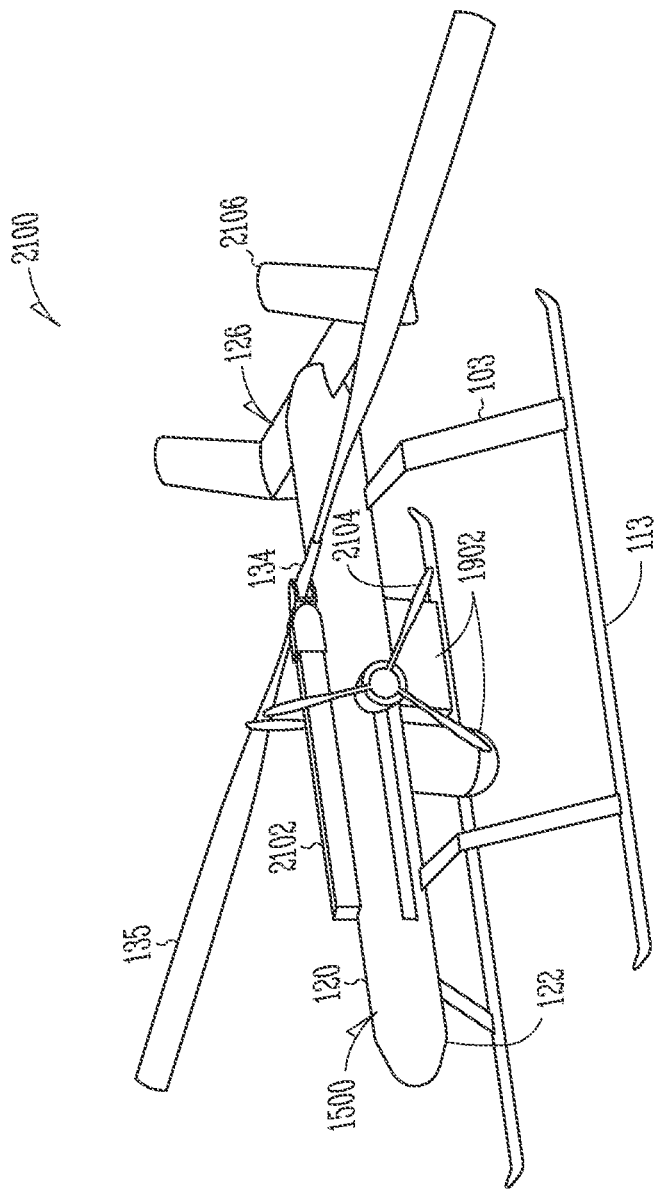
FIG. 21 is a perspective view of an air vehicle according to an example of the present invention.
Figure 22:
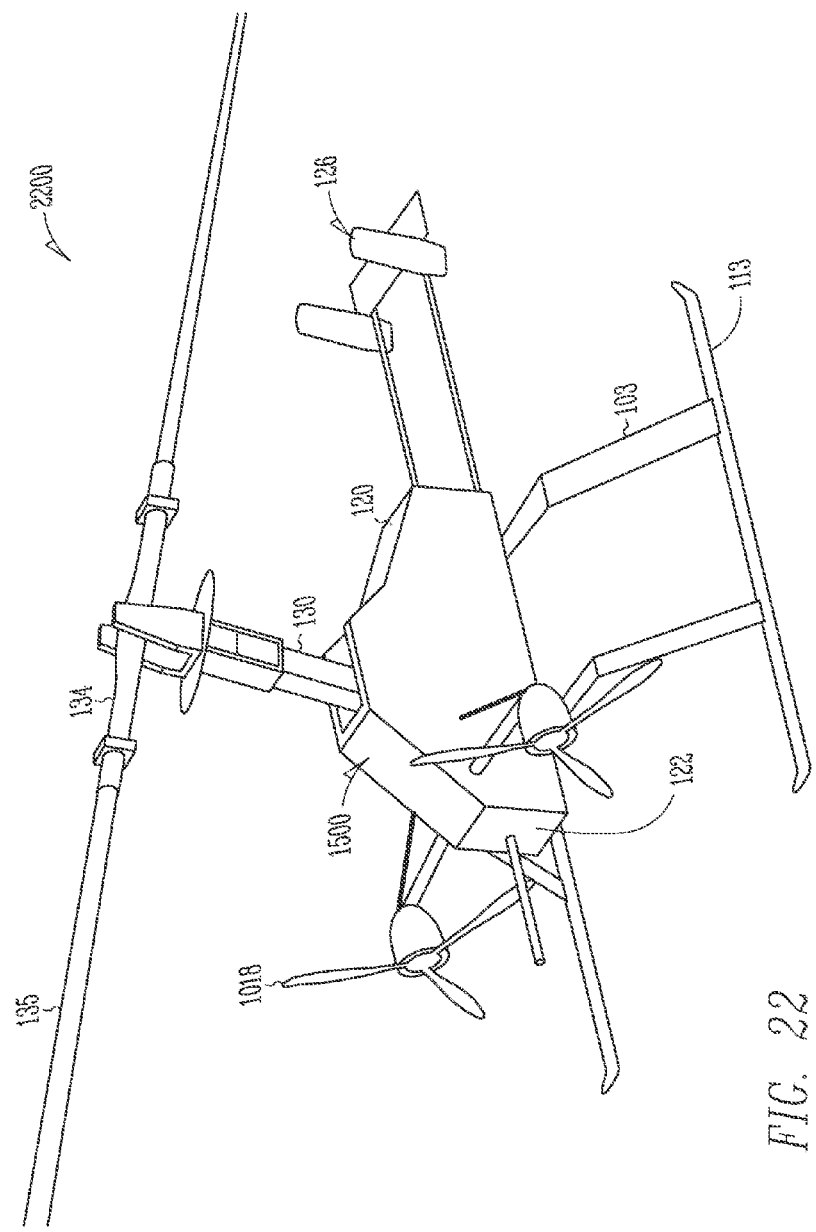
FIG. 22 is a perspective view of an air vehicle according to an example of the present invention.
Figure 23:
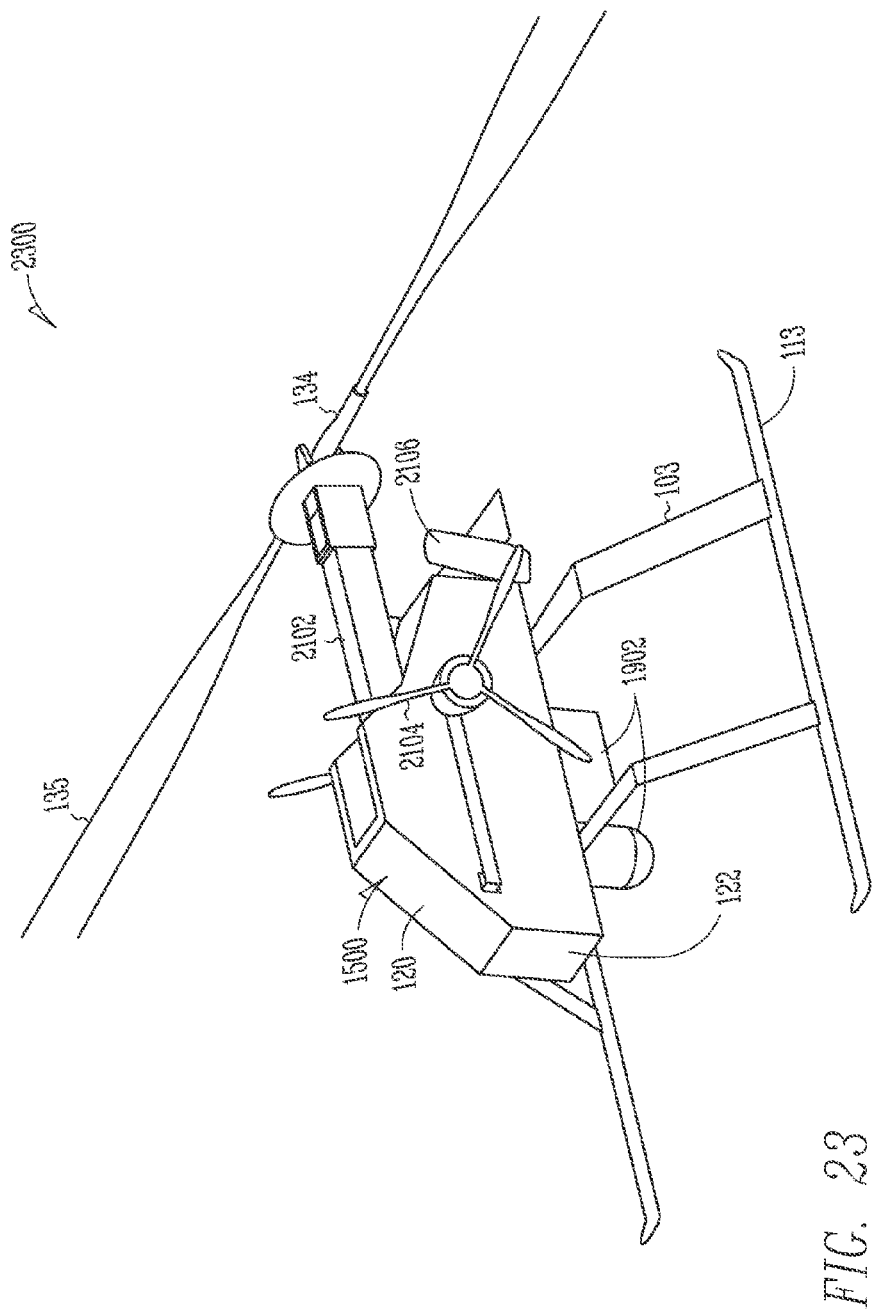
FIG. 23 is a perspective view of an air vehicle according to an example of the present invention.
Figure 24:
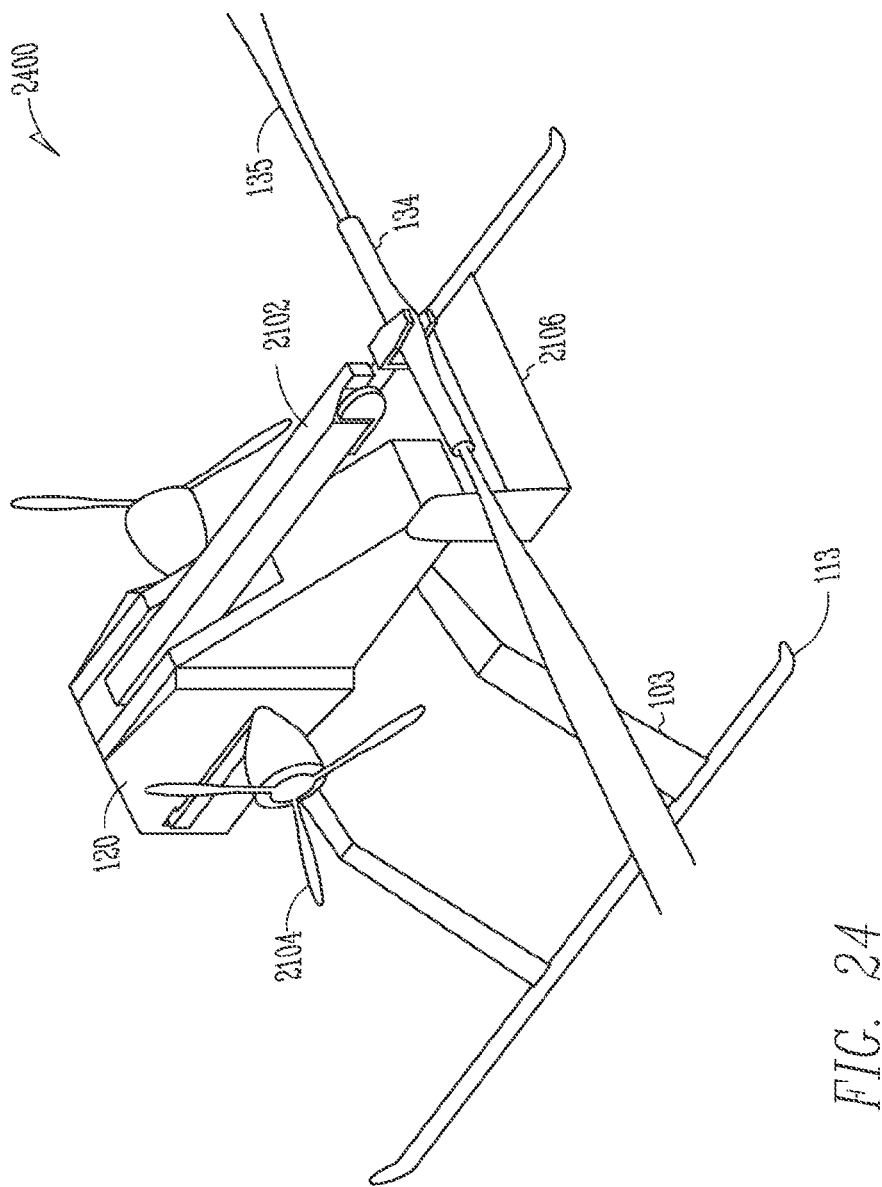
FIG. 24 is a perspective view of an air vehicle according to an example of the present invention.
Figure 25:
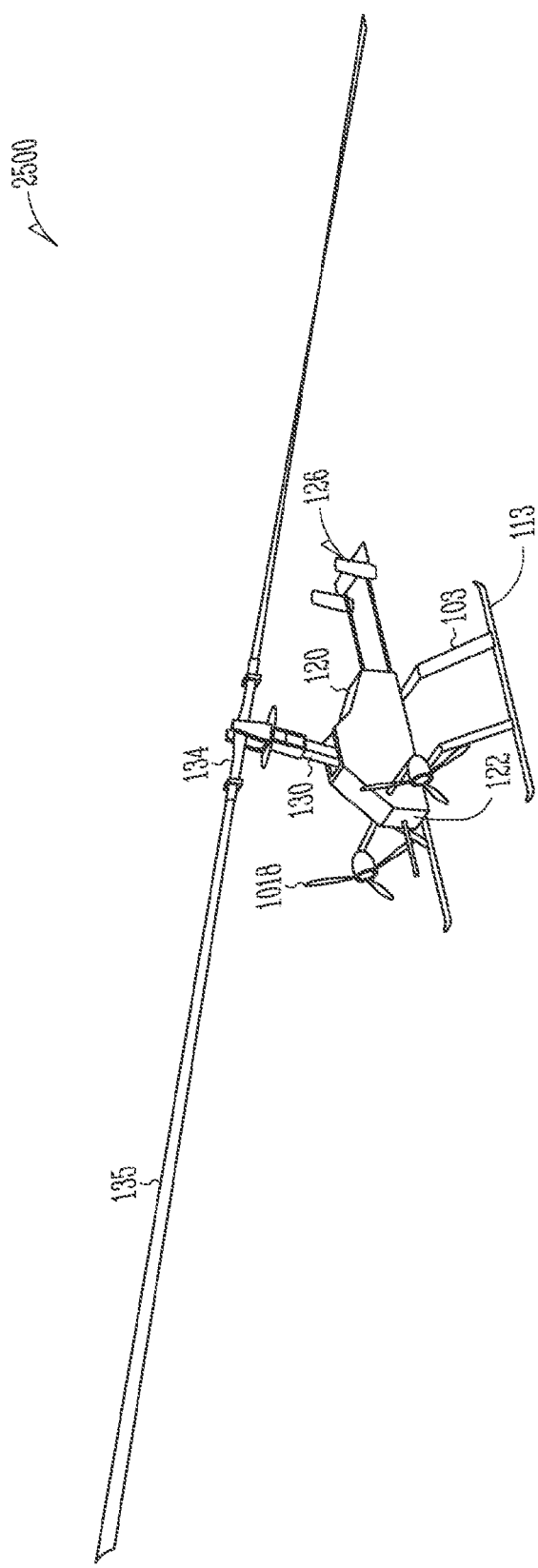
FIG. 25 is a perspective view of an air vehicle according to an example of the present invention.

In a portable, or foldable embodiment (see view 2100 of FIG. 21), foldable mast 2102 can fold on a pivot or generally move to a position adjacent the body 210. Blades 135 may be temporarily removed for transport or storage. The retractable or foldable stabilization system 2106 can slide into a cavity in the body 120 or retract underneath or above the body 120, for example. Propellers, as part of the forward propulsion system or anti-torque system, can be foldable 2104 or retract adjacent or within the body 120, for example. Views 2200, 2300 and 2400 of FIGS. 22-24 show an alternate geometry of an air vehicle 1500 in extended and foldable positions. View 2500 of FIG. 25 shows the fully extended blades 135.

Figure 26:
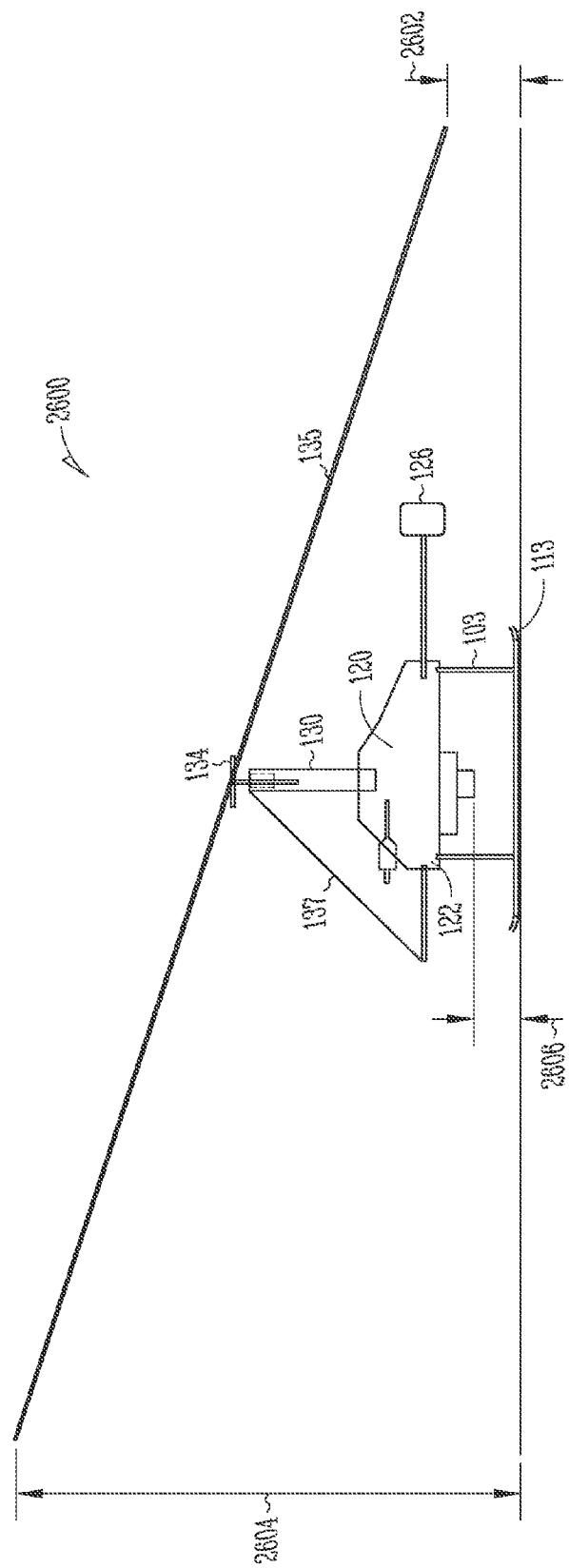
FIG. 26 is a schematic view of an air vehicle according to an example of the present invention.

FIG. 26 is a schematic representation (see view 2600) showing ground clearances. Rear blade ground clearance 2602 may be between about 6 inches to about 12 inches, about 7 inches to about 10 inches or about 8 inches or more, for example. Sensor ground clearance 2606 may be between about 5 inches and 10 inches, about 6 inches to about 9 inches or about 7 inches to about 8 inches from the ground. Front blade ground clearance 2604 or height may be about 24 inches to about 48 inches, about 30 inches to about 36 inches or about 30 to about 32 inches, depending on the angle of the blades, for example.

Referring to FIGS. 27A-D, a schematic view 2700 of folded and unfolded positions of the air vehicle are shown, without undercarriage or movement devices, for clarity. In top view, FIG. 27A, horizontal tail extender width 2702 may be about 3 inches to about 7 inches, about 4 inches to about 6 inches or about 5 inches in width. Folded propeller width 2704 may be about 12 inches to about 18 inches, about 13 inches to about 17 inches or about 15 inches, for example.

In side view, FIG. 27B, nose to folded mast length 2706 can be about 15 inches to about 28 inches, about 18 inches to about 24 inches or about 20 to about 22 inches in length. Nose to retracted tail length 2708 can be about 20 inches to about 30 inches, about 22 to about 28 inches or about 24 to about 26 inches, for example. The height 2710 from a lower body surface to the folded mast can be about 10 inches to about 16 inches, about 12 to about 14 inches or about 12 to about 13 inches.

In extended, or unfolded view in FIG. 27C, the front guidewire to tail length 2718 can be about 40 inches to about 56 inches, about 50 inches to about 54 inches or about 48 to about 52 inches. Body height 2716 can be about 10 inches to about 12 inches or about 12 inches in height. Mast height 2714 can be about 12 inches to about 16 inches or about 14 inches, for example. Total height (minus undercarriage, frame, etc) 2712 can be about 20 to about 30 inches, 24 to about 28 inches or about 25 inches in height.

FIG. 27D shows a top view of the extended vehicle including extended tail width 2722, which can be about 12 inches to about 17 inches, about 14 to about 16 inches or about 15 inches. Propeller width (between two frontal propellers) 2720 can be about 16 to about 24 inches, about 18 to about 22 inches or about 20 inches in width, for example.

Referring to FIGS. 28A-F, views of an air vehicle winch assembly 2800 are shown, according to an example of the present invention. A winch block 2802 can be attached or integrated onto a surface, such as a deck of a ship, for example (see FIG. 28A). The winch block 2802 can be moveble or slideable and can be locked in place, either remotely or manually. The block 2802 can optionally cover or protect a cable reel and also provide stability and security when an air vehicle is in an non-deployed position (i.e., reeled in). The winch block 2802 can optionally cover and protect electronics, such as controllers, remote controls, remote locking receivers, etc. The cable reel located inside or near the winch block 2802 includes a winch cable 2816 (i.e., tether line or tow line) in contact with an air vehicle, such as the nose 122 of an air vehicle.

The winch cable 2816 passes through a winch assembly 2804 that includes a guide funnel 2808 and pivot member 2810. The pivot member 2810 can include a pivot pin 2818 or other mechanism for allowing the winch cable 2816 and air vehicle to pivot while landing or being secured to the surface. The pivot member 2810 can also include locking mechanisms, such as a slip ring 2812 and fixed lock ring 2814. The pivot member 2810 can also be in contact with a data/power cable 2806 that is in electrical communication with the air vehicle. The locking mechanisms can be controlled remotely or manually. The guide funnel 2808 can pivot on the winch block 2802 as the air vehicle is reeled in to line up with the nose 122.

Figure 28A:
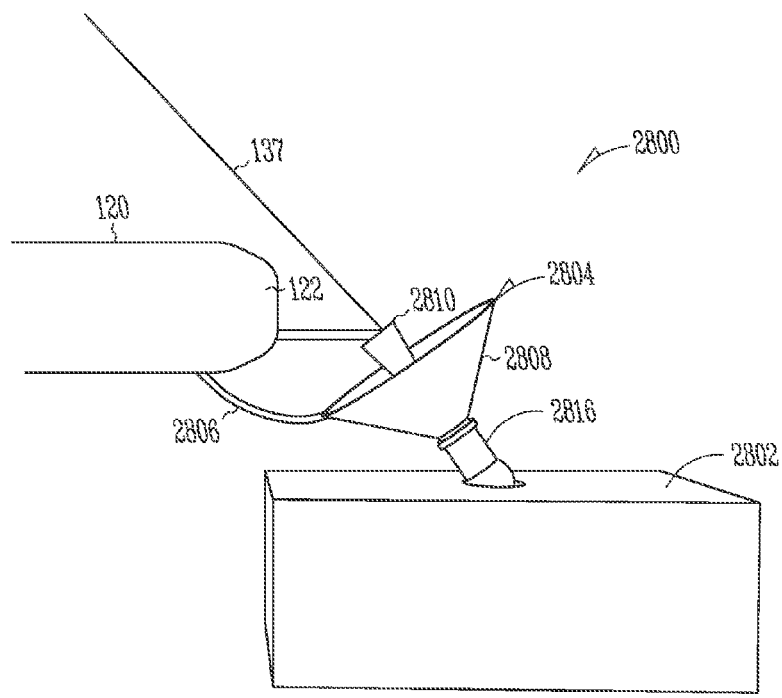
FIGS. 28A-28F are views of an air vehicle winch assembly, according to an example of the present invention.
Figure 28B:
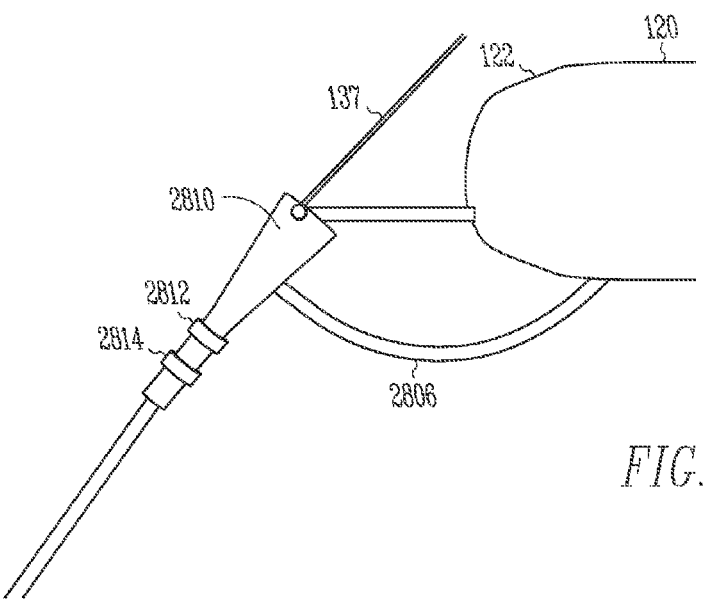
Figure 28C:
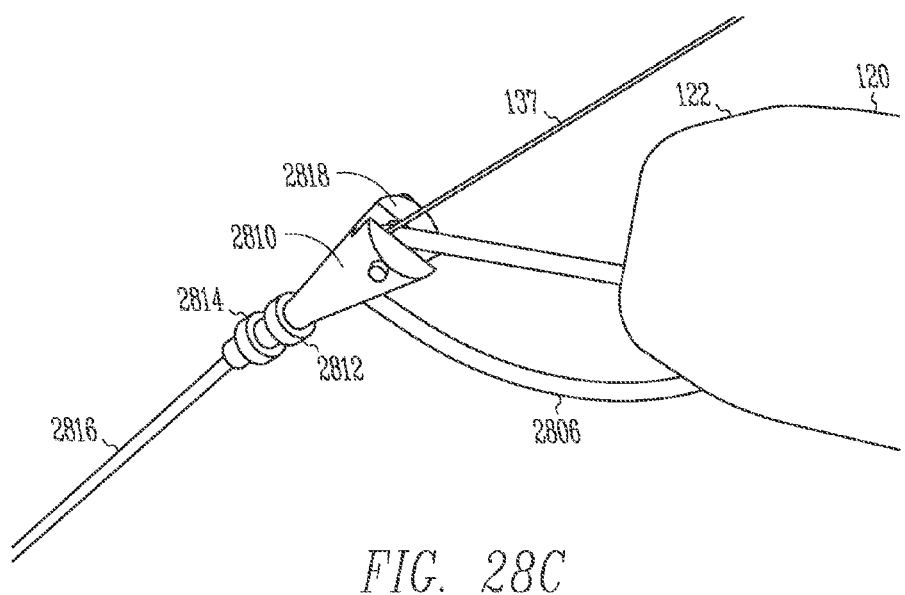
Figure 28D:
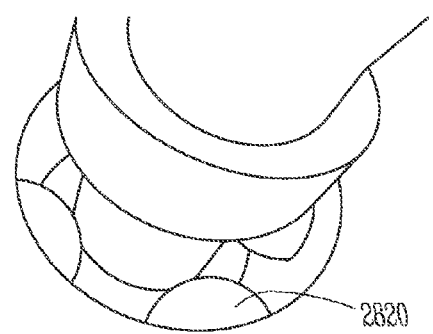
Figure 28E:
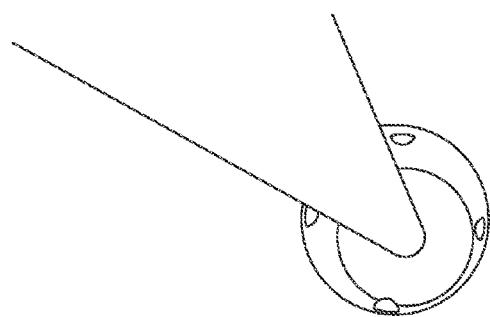
Figure 28F:
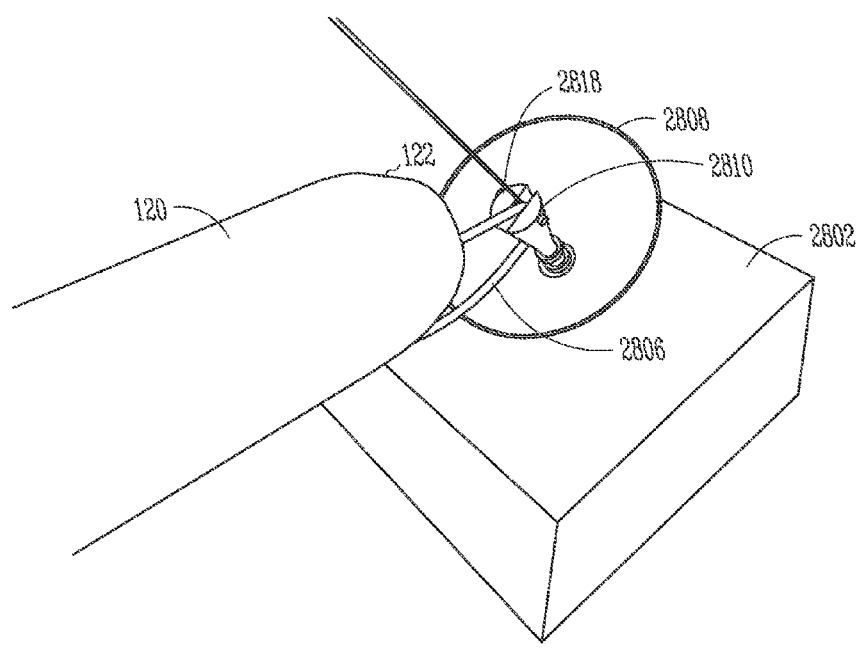

Ball bearings 2820, such as ratchet-type ball bearings or a pivot ball, can be utilized to facilitate the pivoting of the guide funnel 2808 and pivot member 2810 (see views in FIGS. 28D and 28E). The ball bearings 2820 rotate freely with the winch cable 2806, keeping the guide funnel 2808 aligned with the air vehicle. When the pivot member 2810 locks with the air vehicle, the winch block 2802 can also lock in place (if moveable) to secure the air vehicle to the surface or deck. A shut down or stop switch can be incorporated into the pivot member 2810, winch block 2802 or funnel guide 2808 to stop the winch reel. The shut down or stop switch can be controlled remotely or manually, for example.

A controller can communicate with a winch controller through the data/power line, which can include a data communication wire(s) integral with the line (1511 in FIG. 16). The controller on board the air vehicle 1500 can automate the operation of the winch as the controller is applying flight algorithms to ensure its safe flight. A portable electronic cable winch can be optimized for the precise control of vertically-lifted payload. As the system operates, the motor speed is controlled by the user. Cable playout rates under various wind conditions are set and stared in a controller for the vehicle or the control system to control the operation of the winch or displayed to the operator, who in turn can operate the winch and control the playout rate. The winch can have an interface for both power and data transfer.

The air vehicle as described herein can operate as is or supplement maritime patrol craft to counter piracy and counter drug smuggling. The air vehicle can further operate as an electronic warfare platform and operate sensors, missile decoys, displace electromagnetic signature. The air vehicle can extend the range of the coastal patrol craft to protect more area at a given time and increase law enforcement effectiveness. The air vehicle can also be used to monitor fishing area economic zones as well as environmental monitoring.

The air vehicles described herein can further include a transponder to emit a identification signal to identify the vehicle as a friend or a foe as well as identify its position to other aircraft. The position information can also be used in the control systems to alter the flight path of the vehicle to keep the vehicle away from desired flight paths or investigate particular areas.

In the case of anti-piracy operations, the air vehicle 1500 could be mounted in a cargo container and when the ship begins to navigate potential piracy waters, the cargo container can be opened and the air vehicle with sensors can be launched. The container can include a winch system as described herein or the air vehicle can fly freely and monitor the surrounding waters for the ship.

The above flight method(s) described with respect to FIG. 11-14 can also be used with other embodiments of air vehicles, e.g., air vehicles 1500 and/or embodiments shown in FIG. 19-28E. The air vehicle of these embodiments would, in some applications, remain tethered to the towing water craft or land vehicle. As a result, the controller in these air vehicles would compensate for the operation of the towing vehicle. The air vehicle, in some embodiments, would have sufficient power to take off and/or land without forward movement of the towing craft or a headwind. This is possible when the air vehicle is small and lightweight. The power to turn the rotor or drive a propeller can be received from a towing vehicle's power source through the connecting cable from the towing vehicle to the air vehicle, e.g., 1500. The powered air vehicle can also change altitude, e.g., climb, on its own to achieve various tasks. Such tasks can include, but are not limited to, seeking a steadier air flow, reducing turbulence, increasing sensor range, increasing sight line, evading detection, providing a false signature that looks more like an aircraft (e.g., a helicopter), seeking a different air flow direction among others. In an example, the controller on board the air vehicle makes the decision to execute these tasks. In another example, the instruction to execute one of these tasks is sent from the towing vehicle to the air vehicle, e.g., over the physical connection or sent wirelessly to the air vehicle. In an example, the air vehicle can climb to a determined altitude and then transition to auto-gyro flight mode. The flight climb can be controlled by the on-board controller, which uses its sensors, e.g. sensors described with respect to FIG. 5B, to determine flight characteristics and control the flight based on those sensed characteristics along with the operation of the winch and the cable connecting the air vehicle with the towing vehicle.

The controller onboard the air vehicle, e.g., 1500 or shown in FIGS. 19-28F, can also conduct a flight operation when the towing vehicle, e.g., a water craft or land vehicle, stops its forward movement. In this case, the controller senses the flight data and if necessary to maintain flight, will engage a motor to either rotate the rotor or engage propellers, if available, to maintain the flight of the air vehicle. The air vehicle can also sense if a sufficient head wind is available to maintain flight. If so, then the motor need not be engaged. Stated another way, if the towing vehicle, e.g., a water craft or land vehicle, slows down or stops, the wind may change to a trail direction producing a zero relative airspeed across the rotor of the air vehicle. In this case, the controller can power the motor for rotor to maintain flight. The controller can also reposition the air vehicle to a headwind position. If the headwind is sufficient to maintain flight, then the motor can be turned off. If the headwind is not sufficient to maintain flight, then the controller decides on the duty cycle of the motor, e.g., greater than zero percent to one hundred or less.

In a further example, the towing vehicle cannot maintain a steady course, i.e., cannot remain in a straight line or a steady broad turn, e.g. a large radius turn such that the towing cable between towing vehicle and air vehicle remains under some tension for most of the time. In this case, the controller can selectively activate the motor to provide a propulsive force to the air vehicle to maintain a steady flight. This may be particularly useful when the towing vehicle is following a torturous path or conducting evasive maneuvers. In such an instance, the controller can power the flight of the air vehicle to maintain its flight path or conduct its own maneuvers separate from the towing vehicle.

In an example, the controller on the air vehicle, e.g., 1500, can release itself from a tow cable for free flight from the towing vehicle. The air vehicle can operate as a decoy or stay aloft to emit an emergency signal to improve rescue operations.

Structures, methods and systems for a towable, unmanned flying vehicle are described herein. Although the present invention is described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. All documents referred to in the paper are hereby incorporated by reference for any purpose. However, if any such document conflicts with the present application, the present application controls. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:
1. A marine-aerovehicle system, comprising:
a marine vessel capable of towing;
a towed aerovehicle; and
a tow line releasably connected between the towing vessel and towed aerovehicle, the towed aerovehicle including;
a flight body;
an autogyro assembly connected to the flight body; and
a controller to control operation of the autogyro assembly for unmanned flight;
wherein when the controller determines a stop in the towing vessel, the controller automatically releases the tow line and controls the towed aerovehicle flight to a landing by substantially following a flight path determined by sensed signals and a programmed destination.

2. The marine-aerovehicle system of claim 1, wherein the autogyro assembly comprises a mast extending from the body, a rotatable hub on an end of the mast, and a plurality of blades connected to the hub.

3. The marine-aerovehicle system of claim 2, wherein the autogyro assembly comprises a motor to rotate the blades prior to lift off to assist in take off, and wherein the motor does not have enough power to power the aerovehicle through takeoff absent a further motive force.

4. The marine-aerovehicle system of claim 1, wherein the controller senses forward motion to control the autogyro assembly.

5. The marine-aerovehicle system of claim 1, wherein the controller receives a signal from the towing vessel and controls the autogyro assembly using the received signal.

6. The marine-aerovehicle system of claim 2, wherein the controller controls the rotational speed of the hub.

7. The marine-aerovehicle system of claim 2, wherein the autogyro assembly comprises actuators to control one or more angles of the plurality of airfoil blades, and wherein the controller controls the actuators.

8. The marine-aerovehicle system of claim 1, wherein the flight body comprises a container to hold cargo, a rear stabilizer, and an undercarriage to support the container when on the ground.

9. The marine-aerovehicle system of claim 8, wherein the undercarriage includes a trolley that contacts the ground to provide mobility and is removable from the container.

10. The marine-aerovehicle system of claim 2, wherein the controller issues control signals to position the blades for different stages of flight.

11. The marine-aerovehicle system of claim 10, wherein the controller issues a takeoff control signal to set the blades for takeoff, wherein an angle of incidence of the blades is greater at takeoff than during flight.

12. The marine-aerovehicle system of claim 11, wherein the controller issues a prerotation control signal to set the blades for pre-takeoff, wherein the angle of incidence of the airfoil blades is greater at takeoff and flight than at prerotation.

13. The marine-aerovehicle system of claim 12, wherein the controller issues a landing control signal to set the blades for landing, wherein the angle of incidence of the blades is greatest at landing.

14. The marine-aerovehicle system of claim 13, wherein the controller sets the landing angle of incidence to 45 degrees or greater and sets the flight angle of incidence to less 30 degrees.

15. The marine-aerovehicle system of claim 1, further comprising a propulsion system and wherein the controller controls operation of the propulsion system.

16. The marine-aerovehicle system of claim 15, wherein the propulsion system has sufficient thrust to assist in a cargo-laden flight and an essentially cargo-free flight but does not have enough thrust to fly a flight body full of cargo.

17. The marine-aerovehicle system of claim 1, wherein the tow line includes a mechanical component to transfer trust from the towing vessel to the flight body and an electrical component that transfer electrical signals from the towing vessel to the controller.

18. The marine-aerovehicle system of claim 1, wherein the controller receives signals from other controllers of nearby aerovehicles.

19. The marine-aerovehicle system of claim 18, wherein the controller acts as a master controller and issues control signals to nearby aerovehicles.

20. The marine-aerovehicle system of claim 18, wherein the plurality of the nearby aerovehicles are towed by the towing vessel.

21. The marine-aerovehicle system of claim 1, wherein the flight body includes sensors that produce signals, and wherein controller receives the signals and applies instructions to the signals to output control signals.

22. The marine-aerovehicle system of claim 21, wherein the sensors include weight sensors on flight body to determine at least one of the weight and center of gravity of the flight body and cargo, and wherein the controller issues a control signal to adjust the position of the autogyro assembly on the flight body.

23. The marine-aerovehicle system of claim 22, wherein the controller issues signals to control actuators that adjust a longitudinal position of the autogyro assembly, a lateral position of the autogyro assembly, or both.

24. The marine-aerovehicle system of claim 1, wherein the controller receives a forward air speed indicator to control the speed of the flight body and keep the speed below a never-exceed velocity.

25. The marine-aerovehicle system of claim 1, wherein the controller receives a rotation speed signal from the autogyro assembly and issues a brake signal if the rotational speed exceeds a safe rotational speed.

26. The marine-aerovehicle system of claim 16, wherein the propulsion system includes an on-board motor, a drive shaft connected to the motor and extending outside the flight body, and a propeller connected to the drive shaft.

* * * * *